US010367554B2

(12) United States Patent
Fazlollahi et al.

(10) Patent No.: US 10,367,554 B2
(45) Date of Patent: Jul. 30, 2019

(54) MULTI-USER MULTIPLE-INPUT AND MULTIPLE-OUTPUT FOR DIGITAL SUBSCRIBER LINE

(71) Applicant: Futurewei Technologies, Inc., Plano, TX (US)

(72) Inventors: Amir H. Fazlollahi, San Jose, CA (US); Xiang Wang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/953,210

(22) Filed: Apr. 13, 2018

(65) Prior Publication Data

US 2018/0234144 A1    Aug. 16, 2018

Related U.S. Application Data

(63) Continuation of application No. 15/148,698, filed on May 6, 2016, now Pat. No. 9,948,371.
(Continued)

(51) Int. Cl.
| | | |
|---|---|---|
| *H04B 3/32* | (2006.01) | |
| *H04B 3/487* | (2015.01) | |
| *H04B 7/0456* | (2017.01) | |

(52) U.S. Cl.
CPC ............. *H04B 7/0456* (2013.01); *H04B 3/32* (2013.01); *H04B 3/487* (2015.01)

(58) Field of Classification Search
CPC ......... H04B 7/0456; H04B 3/487; H04B 3/32
See application file for complete search history.

(56) References Cited

U.S. PATENT DOCUMENTS 6,823,002 B1 * 11/2004 Betts .................... H04L 5/16
375/219
2007/0133723 A1    6/2007 Cheong et al.
(Continued)

FOREIGN PATENT DOCUMENTS

| CN | 101262253 A | 9/2008 |
| CN | 104221297 A | 12/2014 |

(Continued)

OTHER PUBLICATIONS

Choi, L., et al., "A Transmit Preprocessing Technique for Multiuser MIMO Systems Using a Decomposition Approach," IEEE Transactions on Wireless Communications, vol. 3, No. 1, Jan. 2004, pp. 20-24.
(Continued)

*Primary Examiner* — Wednel Cadeau
(74) *Attorney, Agent, or Firm* — Conley Rose, P.C.

(57) ABSTRACT

A method implemented in a wireless network element (NE), comprising obtaining, via a processor of the wireless NE, a plurality of encoded signals associated with a plurality of downstream (DS) channels in a wireless communication network, wherein the plurality of DS channels form a plurality of DS multiple-input and multiple-output (MIMO) groups, performing, via the processor, MIMO pre-coding on the plurality of encoded signals according to the plurality of DS MIMO groups to produce MIMO pre-coder output signals of the plurality of DS MIMO groups, performing, via the processor, a crosstalk pre-coding across the MIMO groups using a crosstalk pre-coding matrix on the MIMO pre-coder output signals of the plurality of DS MIMO groups to produce a plurality of output signals, with the crosstalk pre-coding matrix computed according to a first DS channel matrix and a DS MIMO channel matrix, wherein the first DS channel matrix comprises first diagonal entries representing first direct channel estimates of the plurality of (Continued)

DS channels at a first subcarrier and first off-diagonal entries representing co-channel interference estimates of the plurality of DS channels at the first subcarrier, a first diagonal block of the first DS channel matrix representing MIMO channels in a first DS MIMO group of the plurality of DS MIMO groups, and wherein the DS MIMO channel matrix comprises a second diagonal block and off-diagonal blocks, the second diagonal block corresponding to the first diagonal block of the first DS channel matrix, and with the off-diagonal blocks comprising values of zeros, and synchronously transmitting, via one or more transmitters of the wireless NE, the plurality of output signals to a plurality of remote wireless NEs via the plurality of DS channels.

20 Claims, 14 Drawing Sheets

Related U.S. Application Data

(60) Provisional application No. 62/159,560, filed on May 11, 2015, provisional application No. 62/180,457, filed on Jun. 16, 2015.

(56) References Cited

U.S. PATENT DOCUMENTS

| | | | | |
|---|---|---|---|---|
| 2012/0257691 | A1* | 10/2012 | Ginis | H04L 7/0016 375/296 |
| 2013/0215951 | A1* | 8/2013 | Nuzman | H04B 3/32 375/227 |
| 2014/0023190 | A1 | 1/2014 | Liang et al. | |

FOREIGN PATENT DOCUMENTS

| | | |
|---|---|---|
| EP | 2748935 A1 | 7/2014 |
| WO | 2013026479 A1 | 2/2013 |

OTHER PUBLICATIONS

Fazlollahi, A., et al., "FEXT Exploitation in Next Generation DSL Systems," IEEE Global Communications Conference, Dec. 4-8, 2016, 6 pages.
Foubert, W., et al., "Exploiting the Phantom-Mode Signal in DSL Applications," IEEE Transactions on Instrumentation and Measurement, vol. 61, No. 4, Apr. 2012, pp. 896-902.
Jiang, Y., et al., "The geometric mean decomposition," Elsevier, Linear Algebra and its Applications 396, 2005, pp. 373-384.
Lee, B., et al., "Gigabit DSL," IEEE Transactions on Communications, vol. 55, No. 9, Sep. 2007, pp. 1689-1692.
Moraes, R., et al., "DMT MIMO IC Rate Maximization in DSL with Combined Signal and Spectrum Coordination," IEEE Transactions on Signal Processing, vol. 61, No. 7, Apr. 1, 2013, pp. 1756-1769.
Spencer, Q., et al., "Zero-Forcing Methods for Downlink Spatial Multiplexing in Multiuser MIMO Channels," IEEE Transactions on Signal Processing, vol. 52, No. 2, Feb. 2004, pp. 461-471.
Taubock, G., et al., "MIMO Systems in the Subscriber-Line Network," Nov. 2000, 3 pages.
Zu, K. et al., "Generalized Design of Low-Complexity Block Diagonalization Type Precoding Algorithms for Multiuser MIMO Systems," IEEE Transactions on Communications, vol. 61, No. 10, Oct. 2013, pp. 4232-4242.
Zu, K., et al., "Low-Complexity Lattice Reduction-Aided Channel Inversion Methods for Large Multi-User MIMO Systems," Conference Record of the Forty Sixth Asilomar Conference on Signals, Systems and Computers, Nov. 4-7, 2012, pp. 463-467.
Swisscom, "G.fast: Additional loop sets for simulation purposes," ITU, Study Group 15, Temporary Document 2013-01-Q4-044, Jan. 28-Feb. 1, 2013, 8 pages.
Swisscom, "G.fast: Insertion Loss and FEXT data of paper insulated cable," ITU, Study Group 15, Temporary Document 2013-03-Q4-051r2, Mar. 2013, 6 pages.
Futurewei Technologies: "Gfast: Physical-layer bonding is superior to bonding above the y-interface," XP044156022, TD: 2015-04-Q4-052, Study 15, vol. 4/15, Apr. 30, 2015, 4 pages.
"Series G: Transmission Systems and Media, Digital Systems and Networks, Digital sections and digital line system—Access networks, Asymmetric digital subscriber line (ADSL) transceivers—2 (ADSL2)," ITU-T, G.992.3, Jul. 2002, 297 pages.
"Self-FEXT Cancellation (Vectoring) for use with VDSL2 transceivers," Draft Recommendation ITU-T, G.993.5, 83 pages.
"Series G: Transmission Systems and Media, Digital Systems and Networks, Digital transmission systems—Digital sections and digital line system—Access networks, Asymmetric digital subscriber line (ADSL) transceivers," ITU-T, G.992.1, Jun. 1999, 256 pages.
"Series G: Transmission Systems and Media, Digital Systems and Networks, Digital sections and digital line system—Access networks, Asymmetric digital subscriber line (ADSL) transceivers, Annex H: Specific requirements for a synchronized symmetrical DSL (SSDSL) system operating in the same cable binder as ISDN as defined in ITU-T G.961 Appendix III," ITU-T, G.992.1, Annex H, Oct. 2000, 44 pages.
"Series G: Transmission Systems and Media, Digital Systems and Networks, Digital sections and digital line system—Access networks, Asymmetric digital subscriber line (ADSL) transceivers, Corrigendum 1," ITU-T, G.992.1, Corrigendum 1, Nov. 2001, 6 pages.
"Series G: Transmission Systems and Media, Digital Systems and Networks, Digital sections and digital line system—Access networks, Asymmetric digital subscriber line (ADSL) transceivers, Corrigendum 2," ITU-T, G.992.1, Corrigendum 2, Jul. 2002, 8 pages.
"Series G: Transmission Systems and Media, Digital Systems and Networks, Digital sections and digital line system—Access networks, Asymmetric digital subscriber line (ADSL) transceivers, Amendment 1: Revised Annex C, new Annex I and new Appendix V," ITU-T, G.992.1, Amendment 1, Mar. 2003, 112 pages.
"Series G: Transmission Systems and Media, Digital Systems and Networks, Digital sections and digital line system—Access networks, Asymmetric Digital Subscriber Line (ADSL) transceivers—Extended bandwidth ADSL2 (ADSL2+)," ITU-T, G.992.5, Jan. 2005, 110 pages.
"Series G: Transmission Systems and Media, Digital Systems and Networks, Digital sections and digital line system—Access networks, Asymmetric Digital Subscriber Line (ADSL) transceivers—Extended bandwidth ADSL2 (ADSL2plus) Amendment 1," ITU-T, G.992.5, Amendment 1, Jul. 2005, 32 pages.
"Series G: Transmission Systems and Media, Digital Systems and Networks, Digital sections and digital line system—Access networks, Asymmetric Digital Subscriber Line (ADSL) transceivers—Extended bandwidth ADSL2 (ADSL2plus) Amendment 2," ITU-T, G.992.5, Amendment 2, Jun. 2006, 12 pages.
"Series G: Transmission Systems and Media, Digital Systems and Networks, Digital sections and digital line system—Access networks, Asymmetric Digital Subscriber Line (ADSL) transceivers—Extended bandwidth ADSL2 (ADSL2plus) Amendment 3," ITU-T, G.992.5, Amendment 3, Dec. 2006, 14 pages.
"Series G: Transmission Systems and Media, Digital Systems and Networks, Digital sections and digital line system—Access networks, Asymmetric digital subscriber line (ADSL) transceivers—Extended bandwidth ADSL2 (ADSL2plus) Amendment 4: Definition of power cutback," ITU-T, G.992.5, Amendment 4, Jul. 2007, 10 pages.
"Series G: Transmission Systems and Media, Digital Systems and Networks, Digital sections and digital line system—Access networks, Very high speed digital subscriber line transceivers 2 (VDSL2)," ITU-T, G.993.2, Feb. 2006, 322 pages.
"Series G: Transmission Systems and Media, Digital Systems and Networks, Access networks—Metallic access Networks, Fast Access to Subscriber Terminals (FAST)—Physical layer specification," ITU-T, G.9701, Dec. 2014, 339 pages.

(56) References Cited

OTHER PUBLICATIONS

Foreign Communication From a Counterpart Application, European Application No. 16792162.6, Extended European Search Report dated Dec. 19, 2017, 10 pages.
Foreign Communication From a Counterpart Application, PCT Application No. PCT/CN2016/081527, International Search Report dated Jul. 27, 2016, 7 pages.
Foreign Communication From a Counterpart Application, PCT Application No. PCT/CN2016/081527, Written Opinion dated Jul. 27, 2016, 4 pages.
Office Action dated May 12, 2017, 17 pages, U.S. Appl. No. 15/148,698, filed May 6, 2016.
Notice of Allowance dated Dec. 6, 2017, 30 pages, U.S. Appl. No. 15/148,698, filed May 6, 2016.
Fazlollahi, A.; U.S. Appl. No. 15/148,698; Title: Multi-User Multiple-Input and Multiple-Output for Digital Subscriber Line; filed May 6, 2016.

* cited by examiner $$H = \begin{bmatrix} m_{11} & m_{12} & m_{13} & h_{14} & h_{15} & h_{16} & h_{17} & h_{18} \\ m_{21} & m_{22} & m_{23} & h_{24} & h_{25} & h_{26} & h_{27} & h_{28} \\ m_{31} & m_{32} & m_{33} & h_{34} & h_{35} & h_{36} & h_{37} & h_{38} \\ h_{41} & h_{42} & h_{43} & n_{44} & n_{45} & h_{46} & h_{47} & h_{48} \\ h_{51} & h_{52} & h_{53} & n_{54} & n_{55} & h_{56} & h_{57} & h_{58} \\ h_{61} & h_{62} & h_{63} & h_{64} & h_{65} & l_{66} & l_{67} & h_{68} \\ h_{71} & h_{72} & h_{73} & h_{74} & h_{75} & l_{76} & l_{77} & h_{78} \\ h_{81} & h_{82} & h_{83} & h_{84} & h_{85} & h_{86} & h_{87} & h_{88} \end{bmatrix} \quad (11)$$

FIG. 6A $$M = \begin{bmatrix} m_{11} & m_{12} & m_{13} \\ m_{21} & m_{22} & m_{23} \\ m_{31} & m_{32} & m_{33} \end{bmatrix} = U_M S_M V_M^H$$

$$N = \begin{bmatrix} n_{44} & n_{45} \\ n_{54} & n_{55} \end{bmatrix} = U_N S_N V_N^H$$

$$L = \begin{bmatrix} l_{66} & l_{67} \\ l_{76} & l_{77} \end{bmatrix} = U_L S_L V_L^H \quad (12)$$

FIG. 6B $$H_2 = \begin{bmatrix} 1 & m'_{12} & m'_{13} & h'_{14} & h'_{15} & h'_{16} & h'_{17} & h'_{18} \\ m'_{21} & 1 & m'_{23} & h'_{24} & h'_{25} & h'_{26} & h'_{27} & h'_{28} \\ m'_{31} & m'_{32} & 1 & h'_{34} & h'_{35} & h'_{36} & h'_{37} & h'_{38} \\ h'_{41} & h'_{42} & h'_{43} & 1 & n'_{45} & h'_{46} & h'_{47} & h'_{48} \\ h'_{51} & h'_{52} & h'_{53} & n'_{54} & 1 & h'_{56} & h'_{57} & h'_{58} \\ h'_{61} & h'_{62} & h'_{63} & h'_{64} & h'_{65} & 1 & l'_{67} & h'_{68} \\ h'_{71} & h'_{72} & h'_{73} & h'_{74} & h'_{75} & l'_{76} & 1 & h'_{78} \\ h'_{81} & h'_{82} & h'_{83} & h'_{84} & h'_{85} & h'_{86} & h'_{87} & h'_{88} \end{bmatrix} \quad (13)$$

FIG. 6C

MULTI-USER MULTIPLE-INPUT AND MULTIPLE-OUTPUT FOR DIGITAL SUBSCRIBER LINE

CROSS-REFERENCE TO RELATED APPLICATIONS

The present application is a continuation of U.S. patent application Ser. No. 15/148,698 filed May 6, 2016 by Amir H. Fazlollahi, et. al., entitled "Multi-User Multiple-Input And Multiple-Output For Digital Subscriber Line," now U.S. Pat. No. 9,948,371, which claims priority to U.S. Provisional Patent Application 62/159,560 filed May 11, 2015 by Amir H. Fazlollahi, and entitled "Multi-User Multiple-Input And Multiple-Output For Digital Subscriber Line," and U.S. Provisional Patent Application 62/180,457 filed Jun. 16, 2015 by Amir H. Fazlollahi and Xiang Wang, and entitled "Multi-User Multiple-Input And Multiple-Output For Digital Subscriber Line," all of which are incorporated by reference.

REFERENCE TO A MICROFICHE APPENDIX

Not applicable.

BACKGROUND

Twisted-pair copper wires were initially designed to carry low-bandwidth voice telephone signals. Today, twisted-pair copper wires are widely used to carry high-bandwidth data signals from a central office (CO), a remote terminal (RT), or a distribution point (DP) to customer premises equipments (CPE) in digital subscriber line (DSL) systems. Asymmetric digital subscriber line (ADSL)/ADSL2/ADSL2+ described in "Asymmetric digital subscriber line (ADSL) transceivers," International Telecommunications Union—Telecommunication Standardization Sector (ITU-T) document G.992.1, 1999, "Asymmetric digital subscriber line transceivers 2 (ADSL2)," ITU-T document G.992.3, 2002, and "Asymmetric digital subscriber line (ADSL) transceivers—Extended bandwidth ADSL2 (ADSL2+)," ITU-T document G.992.5, 2003, which are incorporated by reference, use a bandwidth of up to a few megahertz (MHz). Very-high speed digital subscriber line (VDSL)/VDSL2 described in "Very-high speed Digital Subscriber Line Transceivers 2 (VDSL2 draft)," ITU-T document G.993.2, July 2005, which is incorporated by reference, use a bandwidth of a few tens of MHz. Fast access to subscriber terminals (G.fast) described in the ITU standard "Fast Access to Subscriber Terminal," ITU-T document G.9701, December 2014, which is incorporated by reference, uses a bandwidth of about 100 MHz or higher.

SUMMARY

DSL communications experience various forms of interference, including far-end crosstalk (FEXT). In a vectored system, transceivers at a CO side are collocated, but transceivers at customer premises are distributed. Thus, coordination may only be performed at the CO side to cancel or reduce FEXT. However, in a system where transceivers at the customer premise are also collocated, multiple-input and multiple-output (MIMO) processing may be used to utilize FEXT rather than cancelling FEXT to improve performance. In addition, multi-user-MIMO (MU-MIMO) processing may be used to pre-code or cancel FEXT across MIMO groups. However, the computational complexity for MU-MIMO processing is high due to decomposition of large-size matrices and therefore may not be suitable for implementation in DSL systems. To resolve these and other problems, and as will be more fully explained below, matrix diagonalization is performed on each MIMO group channel sub-matrix separately instead of a large-size full channel matrix, and MIMO pre-coding and cancellation matrix are computed based on the matrix diagonalization.

In one embodiment, the disclosure includes a method implemented in a network element (NE), comprising obtaining, via a processor of the NE, a plurality of encoded signals associated with a plurality of downstream (DS) channels in a network, wherein the plurality of DS channels form a plurality of DS MIMO groups, performing, via the processor, MIMO pre-coding on the plurality of encoded signals according to the plurality of DS MIMO groups, performing, via the processor, crosstalk pre-coding on the plurality of encoded signals jointly after performing the MIMO pre-coding to produce a plurality of output signals, and substantially synchronously transmitting, via transmitters of the NE, the plurality of output signals to a plurality of remote NEs via the plurality of DS channels. In some embodiments, the disclosure also includes a first subset of the plurality of DS channels forms a first DS MIMO group of the plurality of DS MIMO groups, wherein the method further comprises receiving, via receivers of the NE, a MIMO pre-coding matrix for the first DS MIMO group at a first subcarrier, wherein the MIMO pre-coding matrix is decomposed from a DS MIMO channel matrix comprising direct channel estimates of the first subset of the plurality of DS channels at the first subcarrier and FEXT channel estimates of the first subset of the plurality of DS channels at the first subcarrier, and wherein performing the MIMO pre-coding comprises multiplying a second subset of the plurality of encoded signals associated with the first DS MIMO group by the MIMO pre-coding matrix, and/or further comprising obtaining, via the processor, a first DS channel matrix, denoted as H, comprising first diagonal entries representing first direct channel estimates of the plurality of DS channels at a first subcarrier and first off-diagonal entries representing first FEXT channel estimates of the plurality of DS channels at the first subcarrier, wherein a first diagonal block of the first DS channel matrix represent MIMO channels in a first DS MIMO group of the plurality of DS MIMO groups, generating, via the processor, a DS MIMO channel matrix, denoted as $H_M$, comprising a second diagonal block and off-diagonal blocks, wherein the second diagonal block corresponds to the first diagonal block of the first DS channel matrix, and wherein the off-diagonal blocks comprises values of zeros, and computing, via the processor, a FEXT pre-coding matrix, denoted as P, according to a product of an inverse of the first DS channel matrix H and the DS MIMO channel matrix $H_M$, wherein the product is expressed as $P = H^{-1} \times H_M$, wherein performing the crosstalk pre-coding comprises multiplying the plurality of encoded signals by the FEXT pre-coding matrix after performing the MIMO pre-coding, and/or further comprising obtaining, via the processor, second direct channel estimates of the plurality of DS channels at a first subcarrier, second FEXT channel estimates within each of the plurality of DS MIMO groups at the first subcarrier, and third FEXT channel estimates across the plurality of DS MIMO groups at the first subcarrier after performing the MIMO pre-coding and prior to performing the crosstalk pre-coding, wherein the second direct channel estimates and the second FEXT channel estimates are MIMO pre-coded and MIMO post-coded channel estimates, generating, via the processor, a second DS channel matrix comprising second diagonal entries representing the second direct channel estimates, second diagonal blocks each comprising second off-diagonal entries representing corresponding second FEXT channel estimates for each of the plurality of DS MIMO groups, and second off-diagonal blocks representing the third FEXT channel estimates, and inverting, via the processor, the second DS channel matrix to produce a FEXT pre-coding matrix, wherein performing the crosstalk pre-coding comprises multiplying the plurality of encoded signals by the FEXT pre-coding matrix after performing the MIMO pre-coding, and/or further comprising assigning, via the processor, values of zeros to the second off-diagonal entries of the second diagonal blocks before inverting the second DS channel matrix, and/or further comprising substantially synchronously receiving, via receivers of the NE, a plurality of modulated signals from the plurality of remote NEs via a plurality of upstream (US) channels at a second subcarrier, wherein the plurality of US channels form a plurality of US MIMO groups, performing, via the processor, discrete Fourier transform (DFT) on the plurality of modulated signals to produce a plurality of demodulated signals, performing, via the processor, frequency domain equalization on the plurality of demodulated signals to produce a plurality of equalized demodulated signals, performing, via the processor, crosstalk cancellation jointly on the plurality of equalized demodulated signals, and performing, via the processor, MIMO post-coding on the plurality of equalized demodulated signals according to the plurality of US MIMO groups after performing the crosstalk cancellation, and/or a first subset of the plurality of US channels forms an $i^{th}$ US MIMO group of the plurality of US MIMO groups, wherein i is a positive integer, wherein the method further comprises obtaining, via the processor, a US MIMO channel sub-matrix, denoted as $H_{i,i}$, comprising diagonal entries representing first direct channel estimates of the first subset of the plurality of US channels at the second subcarrier and off-diagonal entries representing first far-end crosstalk (FEXT) channel estimates of the first subset of the plurality of US channel at the second subcarrier, decomposing, via the processor, the US MIMO channel sub-matrix $H_{i,i}$ into a first matrix, denoted as $A_{i,i}$, a second matrix, denoted as $W_{i,i}$, and a third matrix, denoted as $B_{i,i}$ where $H_{i,i}=A_{i,i} \times W_{i,i} \times B_{i,i}^{-1}$, and sending, via the transmitters, the third matrix $B_{i,i}$ to corresponding remote NEs to facilitate MIMO pre-coding in a US direction, and wherein performing the MIMO post-coding comprises multiplying a second subset of the plurality of equalized demodulated signals associated with the first subset of the plurality of US channels by a first inverse of the first matrix $A_{i,i}^{-1}$, and multiplying the second subset of the plurality of equalized demodulated signals by a second inverse of the second matrix $W_{i,i}^{-1}$ after multiplying the second subset of the plurality of equalized demodulated signals by the first inverse of the first matrix $A_{i,i}^{-1}$, and/or decomposing the US MIMO channel sub-matrix $H_{i,i}$ by applying singular-value decomposition (SVD) to the US MIMO channel sub-matrix $H_{i,i}$, and/or decomposing the US MIMO channel sub-matrix $H_{i,i}$ by applying geometric mean decomposition (GMD) to the US MIMO channel sub-matrix $H_{i,i}$, and/or further comprising obtaining, via the processor, a first US channel matrix, denoted as H, comprising first diagonal entries representing first direct channel estimates of the plurality of US channels at the second subcarrier and first off-diagonal entries representing first FEXT channel estimates of the plurality of US channels at the second subcarrier, wherein a first diagonal block of the first US channel matrix H represents MIMO channels in a first US MIMO group of the plurality of US MIMO groups, generating, via the processor, a US MIMO channel matrix, denoted as $H_M$, comprising a second diagonal block corresponding to the first diagonal block of the first US channel matrix and off-diagonal blocks comprising values of zeros, and computing, via the processor, a FEXT cancellation matrix, denoted as C, according to a product of the US MIMO channel matrix $H_M$ and an inverse of the first US channel matrix H, wherein the product is expressed as $C=H_M \times H^{-1}$, wherein performing the crosstalk cancellation comprises multiplying the plurality of equalized demodulated signals by the FEXT cancellation matrix, and/or further comprising obtaining, via the processor, second direct channel estimates of the plurality of US channels at the second subcarrier, second FEXT channel estimates within each of the plurality of US MIMO groups at the second subcarrier, and third FEXT channel estimates across the plurality of US MIMO groups after performing the MIMO pre-coding and prior to performing the crosstalk pre-coding, wherein the second direct channel estimates and the second FEXT channel estimates are MIMO pre-coded and MIMO post-coded channel estimates, generating, via the processor, a second US channel matrix comprising second diagonal entries representing the second direct channel estimates, second diagonal blocks each comprising second off-diagonal entries representing corresponding second FEXT channel estimates in each of the plurality of US channels, and second off-diagonal blocks representing the third FEXT channel estimates, and inverting, via the processor, the second US channel matrix to produce a FEXT cancellation matrix, wherein performing the crosstalk cancellation comprises multiplying the plurality of equalized demodulated signals by the FEXT cancellation matrix.

In another embodiment, the disclosure includes a communication system office-side apparatus, comprising a processor configured to obtain a plurality of encoded signals associated with a plurality of DS channels in a network, wherein the plurality of DS channels form a plurality of DS MIMO groups, perform MIMO pre-coding on the plurality of encoded signals according to the plurality of DS MIMO groups, and perform crosstalk pre-coding on the plurality of encoded signals jointly after performing the MIMO pre-coding to produce a plurality of output signals, and a plurality of transmitters coupled to the processor and configured to substantially synchronously transmit the plurality of output signals to a plurality of remote NEs via the plurality of DS channels. In some embodiments, a first subset of the plurality of DS channels that forms a first DS MIMO group of the plurality of DS MIMO groups, wherein the communication system office-side apparatus that further comprises receivers coupled to the processor and configured to receive a MIMO pre-coding matrix for the first DS MIMO group at a first subcarrier, wherein the MIMO pre-coding matrix is decomposed from a DS MIMO channel matrix comprising direct channel estimates of the first subset of the plurality of DS channels at the first subcarrier and FEXT channel estimates of the first subset of the plurality of DS channels at the first subcarrier, and wherein the processor is further configured to perform the MIMO pre-coding by multiplying a second subset of the plurality of encoded signals associated with the first subset of the plurality of DS channels by the MIMO pre-coding matrix, and/or wherein the processor is further configured to obtain second direct channel estimates of the plurality of DS channels at a first subcarrier, second FEXT channel estimates within each of the plurality of DS MIMO groups at the first subcarrier, and third FEXT channel estimates across the plurality of DS MIMO groups after performing the MIMO pre-coding and prior to performing the crosstalk pre-coding, wherein the second direct channel estimates and the second FEXT channel estimates are MIMO post-coded channel estimates, generate a second DS channel matrix comprising second diagonal entries representing the second direct channel estimates, second diagonal blocks each comprising second off-diagonal entries representing corresponding second FEXT channel estimates for each of the plurality of DS MIMO groups, and second off-diagonal blocks representing the third FEXT channel estimates, invert the second DS channel matrix to produce a FEXT pre-coding matrix, and perform the crosstalk pre-coding by multiplying the plurality of encoded signals by the FEXT pre-coding matrix after performing the MIMO pre-coding, and/or further comprising a plurality of receivers coupled to the processor and configured to couple to the plurality of remote NEs via a plurality of US channels, wherein the plurality of US channels form a plurality of US MIMO groups, and receive a plurality of US signals from the plurality of remote NEs via the plurality of US channels at a second subcarrier, wherein the processor is further configured to perform crosstalk cancellation jointly on the plurality of US signals, and perform MIMO post-coding on the plurality of US signals according to the plurality of US MIMO groups after performing the crosstalk cancellation, and/or a first subset of the plurality of US channels forms an $i^{th}$ US MIMO group of the plurality of US MIMO groups, wherein i is a positive integer, wherein the processor is further configured to obtain a US MIMO channel sub-matrix, denoted as $H_{i,i}$, comprising diagonal entries representing direct channel estimates of the first subset of the plurality of US channels at the second subcarrier and off-diagonal entries representing FEXT channel estimates of the first subset of the plurality of US channels, decompose the US MIMO channel sub-matrix $H_{i,i}$, into a first matrix, denoted as $A_{i,i}$, a second matrix, denoted as $W_{i,i}$, and a third matrix, denoted as $B_{i,i}$, where $H_{i,i}=A_{i,i}\times W_{i,i}\times B_{i,i}^{-1}$; and perform the MIMO post-coding by multiplying a second subset of the plurality of US signals associated with the first subset of the plurality of US channels by a first inverse of the first matrix $A_{i,i}^{-1}$, and multiplying the second subset of the plurality of US signals by a second inverse of the second matrix $W_{i,i}^{-1}$ after multiplying a second subset of the plurality of US signals associated with the first subset of the plurality of US channels by the first inverse of the first matrix $A_{i,i}^{-1}$, and wherein the transmitter is further configured to send the third matrix $B_{i,i}$ to corresponding remote NEs to facilitate MIMO pre-coding in a US direction, and/or wherein the processor is further configured to obtain second direct channel estimates of the plurality of US channels at the second subcarrier, second FEXT channel estimates within each of the plurality of US MIMO groups at the second subcarrier, and third FEXT channel estimates across the plurality of US MIMO groups after performing the MIMO pre-coding and prior to performing the crosstalk pre-coding, wherein the second direct channel estimates and the second FEXT channel estimates are MIMO pre-coded and MIMO post-coded channel estimates, generate a second US channel matrix comprising second diagonal entries representing the second direct channel estimates, second diagonal blocks each comprising second off-diagonal entries representing corresponding second FEXT channel estimates for each of the plurality of US MIMO groups, and second off-diagonal blocks representing the third FEXT channel estimates, invert the second US channel matrix to produce a FEXT cancellation matrix, and perform the crosstalk cancellation by multiplying the plurality of US signals by the FEXT cancellation matrix.

In yet another embodiment, the disclosure includes a DSL remote-side apparatus, comprising a plurality of receivers configured to receive a plurality of DS signals from a DSL office-side apparatus via a subset of a plurality of DS channels forming a DS MIMO group, wherein the plurality of DS signals are pre-coded according to a DS MIMO pre-coding matrix associated with the DS MIMO group at a first subcarrier and according to a DS FEXT pre-coding matrix associated with DS FEXT channels of the plurality of DS channels at the first subcarrier, and a processor coupled to the plurality of receivers and configured to perform MIMO post-coding on the plurality of DS signals according to a DS MIMO post-coding matrix associated with the DS MIMO group. In some embodiments, the disclosure also includes further comprising transmitters coupled to the processor and configured to send the DS MIMO pre-coding matrix to the DSL office-side apparatus to facilitate MIMO pre-coding in a DS direction, wherein the processor is further configure to obtain a DS MIMO channel sub-matrix, denoted as $H_{i,i}$, comprising diagonal entries representing first direct channel estimates of the plurality of DS channels at the first subcarrier and off-diagonal entries representing FEXT channel estimates of the plurality of DS channels, decompose the DS MIMO channel sub-matrix $H_{i,i}$ into a first matrix, denoted as $A_{i,i}$, a second matrix, denoted as $W_{i,i}$, and a third matrix, denoted as $B_{i,i}$, where $H_{i,i}=A_{i,i}\times W_{i,i}\times B_{i,i}^{-1}$, wherein the DS MIMO pre-coding matrix corresponds to the third matrix, and wherein the DS MIMO post-coding matrix is expressed as $W_{i,i}^{-1}\times A_{i,i}^{-1}$, and perform the MIMO post-coding by multiplying the plurality of DS signals by a first inverse of the first matrix $A_{i,i}^{-1}$, and multiplying the plurality of DS signals by a second inverse of the second matrix $W_{i,i}^{-1}$ after multiplying the plurality of DS signals by the first inverse of the first matrix $A_{i,i}^{-1}$, and/or wherein the receivers are further configured to receive a US MIMO pre-coding matrix, wherein the processor is further configured to obtain a plurality of encoded signals associated with a plurality of US channels forming a US MIMO group at a second subcarrier, and multiply the plurality of encoded signals by the US MIMO pre-coding matrix to produce a plurality of output signals, wherein the DSL remote-side apparatus further comprises a plurality of transmitters coupled to the processor and configured to transmit the plurality of output signals to the DSL office-side apparatus via the plurality of US channels at the second subcarrier, and wherein the US MIMO pre-coding matrix is decomposed from a US MIMO channel sub-matrix comprising diagonal entries representing direct channels of the plurality of US channels at the second subcarrier and off-diagonal entries representing US FEXT channels of the plurality of US channels at the second subcarrier.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

FIGS. 6A-C are equations used to compute matrices in the MU-MIMO DSL system of FIG. 6.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
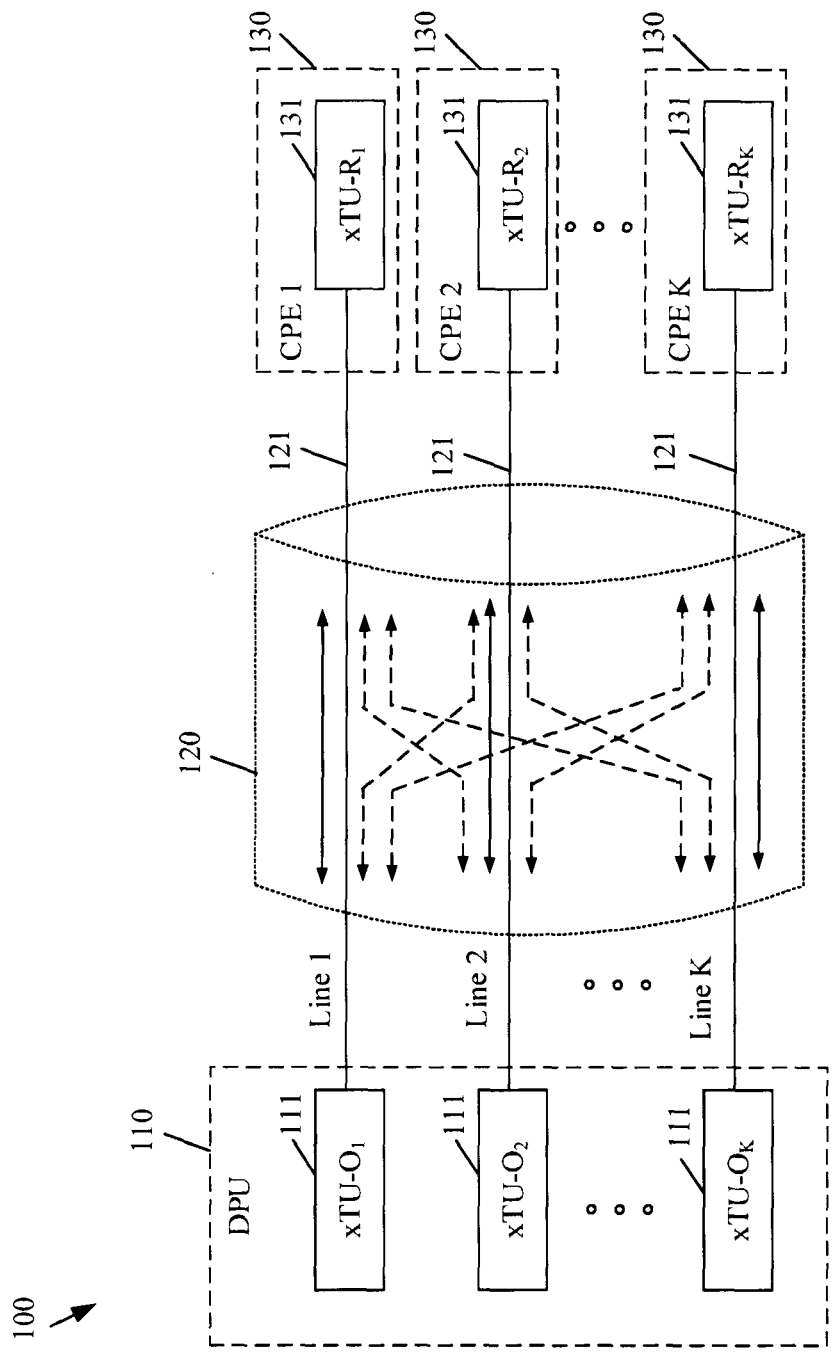
FIG. 1 is a schematic diagram of an embodiment of a DSL system.

FIG. 1 is a schematic diagram of an embodiment of a DSL system 100. The system 100 may be any DSL system as defined by the ITU-T. The system 100 comprises a distribution point unit (DPU) 110 coupled to a plurality of CPEs 130 via a plurality of subscriber lines 121, where at least some of the subscriber lines 121 are bundled in a cable binder 120. The DPU 110 is located at an operator end of the system 100 such as a CO, an exchange, a cabinet, or a distribution point, which is connected to a backbone network such as the Internet via one or more intermediate networks. The intermediate networks may include an optical distribution network (ODN). The CPEs 130 are shown as CPE 1 to CPE K and are located at distributed customer premises or subscriber locations and may be further connected to devices such as telephones, routers, and computers. The subscriber lines 121 are twisted or untwisted copper pairs shown as line 1 to line K. The system 100 may be configured as shown or alternatively configured as determined by a person of ordinary skill in the art to achieve similar functionalities.

The DPU 110 is any device configured to communicate with the CPEs 130. The DPU 110 terminates and aggregates DSL signals from the CPEs 130 and hands the aggregated DSL signals off to other network transports. In a DS direction, the DPU 110 forwards data received from a backbone network to the CPEs 130. In a US direction, the DPU 110 forwards data received from the CPEs 130 onto the backbone network. The DPU 110 in some examples comprises a plurality of xDSL office-side transceiver units (xTU-O) 111, where 'x' indicates any DSL standard. For instance, 'x' stands for 'A' in ADSL2 or ADSL2+ systems, 'V' in VDSL or VDSL2 systems, and 'F' in G.fast systems. The xTU-Os 111 are shown as xTU-O$_1$ to xTU-O$_K$. Each xTU-O 111 comprises a transmitter and a receiver configured to transmit and receive signals over a corresponding subscriber line 121 using discrete multi-tone (DMT) modulation. DMT modulation divides a signal spectrum of a subscriber line into a number of discrete frequency bands and assigns a number of bits to each frequency band according to a channel condition of each frequency band of the subscriber line. The frequency bands are also referred to as tones or subcarriers.

In DMT modulation, a transmitter encodes data bits using forward error correction (FEC) and maps the encoded data bits to quadrature amplitude-phase modulation (QAM) constellations. Each QAM constellation is mapped to a subcarrier. Thus, the QAM constellations are in a frequency domain. The transmitter performs inverse fast Fourier transform (IFFT) to convert the frequency-domain QAM constellations into a time-domain signal, which is referred to as a DMT symbol. The transmitter pre-appends a cyclic prefix (CP) to each DMT symbol to avoid inter-symbol-interference (ISI) and inter-carrier-interference (ICI) at a receiver. The transmitter transmits DMT signals carrying CP-pre-appended DMT symbols to a corresponding receiver at the CPEs 130.

Upon receiving a DMT signal, a receiver searches for the beginning of a DMT symbol, discards the CP, and performs fast Fourier transform (FFT) to convert the DMT symbol to a frequency-domain signal. The receiver multiplies the frequency-domain signal by a frequency-domain equalizer (FEQ) sample by sample. For example, FEQ coefficients may be single-tap complex values per FFT output or tone. The receiver performs FEC decoding on the demodulated and equalized signal to recover the original data bits transmitted by a DMT transmitter.

The DPU 110 may further comprise other functional units for performing physical (PHY) layer signal processing, open system interconnection (OSI) model layer 2 (L2) and above (L2+) processing, activations of the CPEs 130, resource allocation, and other functions associated with the management of the system 100.

The CPEs 130 are any devices configured to communicate with the DPU 110. The CPEs 130 act as intermediaries between the DPU 110 and connected devices to provide Internet access to the connected devices. In a DS direction, the CPEs 130 forward data received from the DPU 110 to corresponding connected devices. In a US direction, the CPEs 130 forward data received from the connected devices to the DPU 110. Each CPE 130 comprises an xDSL remote-side transceiver unit (xTU-R) 131. The xTU-Rs 131 are shown as xTU-R$_1$ to xTU-R$_K$. Each xTU-R 131 comprises a receiver and a transmitter configured to transmit and receive signals over a corresponding subscriber line 121 using DMT modulation. The CPEs 130 may further comprise other functional units for performing PHY layer processing and other management related functions.

In the system 100, the DPU 110 and the CPEs 130 negotiate configuration parameters for data transmission in both US and DS directions during a phase known as initialization or training, before transmissions of information data during a phase known as showtime. US refers to the transmission direction from the CPEs 130 to the DPU 110, whereas DS refers to the transmission direction from the DPU 110 to the CPEs 130. Some examples of configuration parameters are channel information and bit allocations. Channel information is associated with channel conditions of the subscriber lines 121 at different tones. Bit allocation may include a number of bits to be allocated or loaded at each frequency tone of a DMT symbol based on the channel conditions.

The system 100 may experience various interferences, such as near-end crosstalk (NEXT) and FEXT. NEXT refers to the interference that occurs at a receiver from a transmitter located at the same end of a cable such as the subscriber lines 121 within a cable binder 120 from which a signal was transmitted. FEXT refers to the interference that propagates down and occurs at the opposite (far) end of a cable. In one embodiment, the system 100 employs frequency-division duplexing (FDD) to simultaneously transmit US and DS signals in different frequency bands to avoid NEXT. In FIG. 1, the solid arrows represent direct channels from a given xTU-O 111 to a corresponding xTU-R 131 and the dashed arrows represent FEXT channels between the xTU-Os 111 and the xTU-Rs 131. In such an embodiment, a timing advance technique is used to synchronize all transmissions in the system 100 and to orthogonalize received signals and echoes of transmitted signals to avoid NEXT spectral leakage into the receiver. When transmissions in each US and DS direction are synchronized among the subscriber lines 121, NEXT is orthogonal to the received signal in each direction. In another embodiment, the system 100 employs time-division duplexing (TDD) to transmit US and DS signals at different time slots, which removes the effect of NEXT. However, FEXT remains in the system 100 whether the system 100 operates in a FDD mode or a TDD mode. In addition, FEXT coupling among the subscriber lines 121 increases as the frequency increases, and thus may degrade system performance both in terms of data rate and stability.

Figure 2:
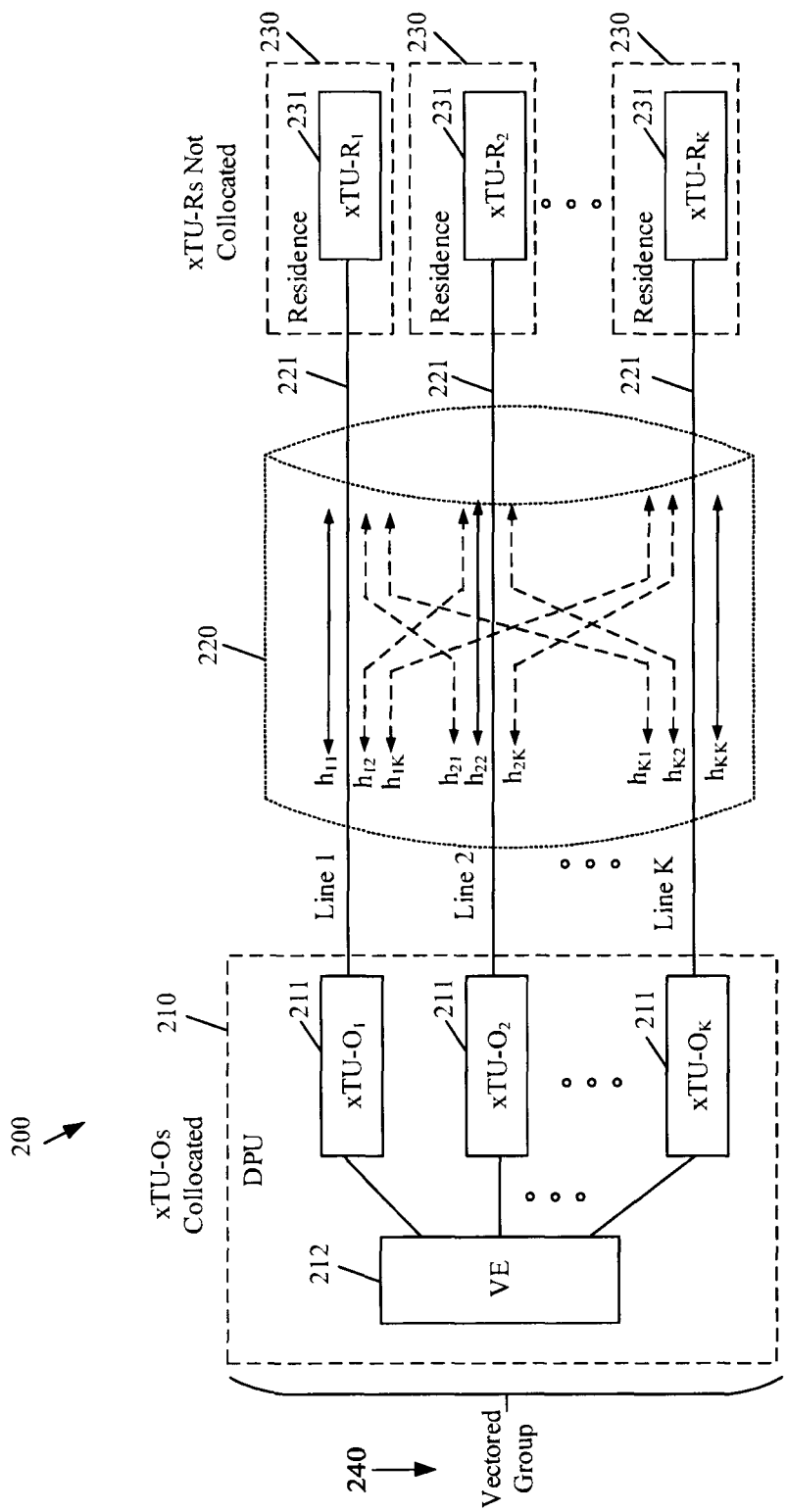
FIG. 2 is a schematic diagram of an embodiment of a vectored DSL system.

FIG. 2 is a schematic diagram of a vectored DSL system 200. The system 200 is similar to the system 100, but performs vectoring as described in "Self-FEXT Cancellation (Vectoring) for use with VDSL2 transceivers," ITU-T document G.993.5 (G.vector), January 2010, which is incorporated by reference, and the ITU-T document G.9701. Vectoring is a technique that coordinates signals among a group of lines such as the subscriber lines 121 to reduce the level of FEXT so that system performance may be improved. The system 200 comprises a vector engine (VE) 212, a plurality of xTU-Os 211 similar to the xTU-Os 111, and a plurality of xTU-Rs 231 similar to the xTU-Rs 131. The xTU-Os 211 are coupled to the XTU-Rs 231 via subscriber lines 221 similar to the subscriber lines 121 bundled in a cable binder 220 similar to the cable binder 120. The xTU-Os 211 are shown as $xTU-O_1$ to $xTU-O_K$ and are collocated at a DPU 210 similar to the DPU 110. The VE 212 is located at the DPU 210 and coupled to the xTU-Os 211. The xTU-Rs 231 are shown as $xTU-R_1$ to $xTU-R_K$ and are located at different residences 230. The residences 230 are also referred to as subscriber locations or customer premises or users. The collocated xTU-Os 211 and the non-collocated xTU-Rs 231 form a vectored group 240. The solid arrows represent direct channels from a given xTU-O 211 to a corresponding xTU-R 231. The dashed arrows represent FEXT channels between the xTU-Os 211 and the xTU-Rs 231. The VE 212 is configured to perform FEXT cancellation both in the DS and US directions. FEXT cancellation in the DS direction is performed by a FEXT precoder.

When all the transmitters of the xTU-Os 211 are synchronized, each DS tone received at an xTU-R 231 experiences FEXT only from the same tone of adjacent lines. Similarly, when all transmitters of the xTU-Rs 231 are synchronized, each US tone received at an xTU-O 211 experiences FEXT only from the same tone of adjacent lines. Thus, a frequency-domain channel matrix $H_c$ may be defined, per tone, for each DS and US directions as follows:

$$H_c = \begin{bmatrix} h_{11} & h_{12} & \ldots & h_{1K} \\ h_{21} & h_{22} & \ldots & h_{2K} \\ \ldots & \ldots & \ldots & \ldots \\ h_{K1} & h_{K2} & \ldots & h_{KK} \end{bmatrix} \quad (1)$$

where the diagonal elements $h_{ii}$ represent direct channels between a given xTU-O 211 and a corresponding xTU-R 231. The off-diagonal elements $h_{ij}$, where $i \neq j$, represents FEXT channels and refers to the channel from a $j^{th}$ transmitter into an $i^{th}$ receiver. All elements $h_{ij}$ are complex scalar values for $1 \leq i \leq K$ and $1 \leq j \leq K$. It should be noted that there is a different channel matrix for each tone, and there are different channel matrices for the DS FEXT channels as seen at the xTU-Rs 231 and for the US FEXT channels as seen at the xTU-Os 211.

The ITU-T documents G.vector and G.fast describe procedures to perform vectoring and estimation of the channel matrices H. During a training or initialization phase, the xTU-Os 211 transmit DS training signals in the DS direction and each $i^{th}$ xTU-R 231 estimates and computes DS $h_{i,j}$ for $1 \leq j \leq K$ and for all DS tones from the received DS training signals. The xTU-Rs 231 send the DS $h_{i,j}$ estimates to the xTU-Os 211 via a backchannel defined in the standard. After receiving all the DS h, estimates, the xTU-Os 211 provide the DS $h_{i,j}$ estimates to the VE 212 and the VE 212 constructs a DS channel matrix as shown in equation (1) for each DS tone according to the received DS $h_{i,j}$ estimates. Similarly, the xTU-Rs 231 transmit US training signals in the US direction during a training or initialization phase and the xTU-Os 211 estimate and compute US $h_{i,j}$ for $1 \leq j \leq K$ and for all US tones from the received US training signals. After obtaining all the US $h_{i,j}$ estimates, the xTU-Os 211 provides the US $h_{i,j}$ estimates to the VE 212 and the VE 212 constructs a US channel matrix as shown in equation (1) for each US tone according to the US $h_{i,j}$ estimates. Subsequently, the VE 212 performs per-tone DS FEXT pre-coding based on corresponding DS channel matrices and per-tone US FEXT cancellation based on corresponding US channel matrices.

As shown in the system 200, the xTU-Os 211 are collocated, but the xTU-Rs 231 are not collocated. As such, coordination for FEXT processing is only performed at the collocated xTU-Os 211, but not at the non-collocated xTU-Rs 231. Thus, in terms of FEXT, the system 200 may not perform more than cancelling and eliminating the undesirable FEXT. However, in some DSL deployments such as G.fast deployments, at least one subscriber residence may comprise two or more subscriber lines connecting to a CO or a DPU. Therefore, at least some xTU-Rs are collocated at a single subscriber residence. The collocation of at least some xTU-Rs in addition to the collocated xTU-Os may allow for more advanced signal processing techniques such as MIMO processing to further improve system performance under FEXT.

In a MIMO system, all xTU-Rs are collocated. In this case, because coordination may be performed at both a DPU and a subscriber or residence location, MIMO signal processing may be used to utilize FEXT rather than cancelling FEXT. When the FEXT signal is strong, MIMO processing may significantly enhance performance, for example, a signal enhancement by a few decibels (dB). Strong FEXT occurs on DSL lines at higher frequencies (e.g., higher than 50-100 MHz).

A MIMO system may use a SVD method or variations of SVD with pre-coder and post-coder or post-filter matrices that are unitary matrices and conserve power. In addition, such MIMO system gains from channel diversity because FEXT signal from a transmitter to another receiver is exploited rather than mitigated. When N copper wire pairs are provided to a single subscriber, where N is a positive integer, alternative modes or phantom modes may be used in addition to regular differential modes. With N copper wire pairs, N differential and N−1 phantom modes are available, thus increasing the number of available channels to 2N−1. As such, alternative modes and phantom modes significantly increase the channel capacity between a DPU and a subscriber, as described more fully below.

MIMO processing is commonly used in wireless systems to gain channel diversity. A dedicated frequency band is used between a base station and a mobile station each having multiple antennas. N transmit antennas and N receive antennas create a MIMO system with a N×N channel matrix. A wireless system with M mobile stations each having N antennas communicating with a base station having M times N transmit antennas within the same frequency band is a MU-MIMO system. Interference within each MIMO group may be utilized while the interference across the MIMO groups has to be mitigated. A similar MU-MIMO system in DSL is a DSL system, where at least one subscriber is served by two or more lines.

MU-MIMO processing is commonly used in wireless communication systems to gain channel diversity as described in Lai-U Choi and Ross D. Murch, "A transmit Preprocessing Technique for Multiuser MIMO Systems Using a Decomposition Approach," Institute of Electrical and Electronics Engineers (IEEE) Transactions on Wireless Communications, Vol. 3, No. 1, January 2004 (Choi) and Quentin H. Spencer, A. Lee Swindlehurst, and Martin Haardt, "Zero-Forcing Methods for Downlink Spatial Multiplexing in Multiuser MIMO Channels," IEEE Transactions on Signal Processing, Vol. 52, No. 2, February 2004 (Spencer), which are incorporated by reference. The methods of Choi and Spencer are computationally intensive due to block diagonalization of a large channel matrix. Keke Zu, et al., "Generalized Design of Low-Complexity Block Diagonalization Type Precoding Algorithms for Multiuser MIMO Systems," IEEE TRANSACTION ON COMM., VOL. 61, No. 10, October 2013 (Zu) describes a lattice reduction aided simplified generalized minimum mean squared error channel inversion (LR-S-GMI-MMSE) method to reduce MIMO computational complexity when compared to Spencer's method. However, the LR-S-GMI-MMSE method only applies to transmit pre-coding, but not receive post-coding. Thus, the LR-S-GMI-MMSE method may be applied for DS only and not US and therefore may not be suitable for implementation in DSL systems.

Disclosed herein are various embodiments for utilizing FEXT within a group of MIMO channels while precoding and cancelling FEXT across MIMO groups. The disclosed embodiments are suitable for use in a DSL system that comprises collocated xTU-Os coupled to at least some collocated xTU-Rs. The xTU-Rs located at the same residence and corresponding xTU-Os form a MIMO group. In a DS direction, the collocated xTU-Os perform MIMO pre-coding and the collocated xTU-Rs perform MIMO post-coding to utilize FEXT among MIMO channels within a MIMO group. The collocated xTU-Os perform FEXT pre-coding to cancel FEXT across the MIMO groups. Similarly, in a US direction, the collocated xTU-Rs perform MIMO pre-coding and the collocated xTU-Os perform MIMO post-coding to utilize FEXT among MIMO channels within a MIMO group. The collocated xTU-Os perform FEXT cancellation to cancel FEXT across the MIMO groups. In each of the US and DS directions, the disclosed embodiments first diagonalize each MIMO group channel sub-matrix or block separately and determine MIMO pre-coding and post-coding matrices based on the matrix diagonalization. After determining the MIMO pre-coding and MIMO post-coding matrices, the disclosed embodiments determine a FEXT pre-coding matrix for the DS direction and a FEXT cancellation matrix for the US direction to mitigate FEXT across the MIMO groups. The disclosed embodiments are computationally efficient since matrix diagonalizations are applied to each MIMO group sub-channel matrix separately instead of a complete channel matrix of all channels with a larger dimension. For example, in a DSL system with 5 MIMO groups each having 2 pairs of lines, the disclosed embodiments reduce computational complexity by about 18 times and about 2.5 times when compared to the Spencer and the LR-S-GMI-MMSE methods, respectively, while having comparable performance to Spencer's method and better performance than LR-S-GMI-MMSE method.

Figure 3:
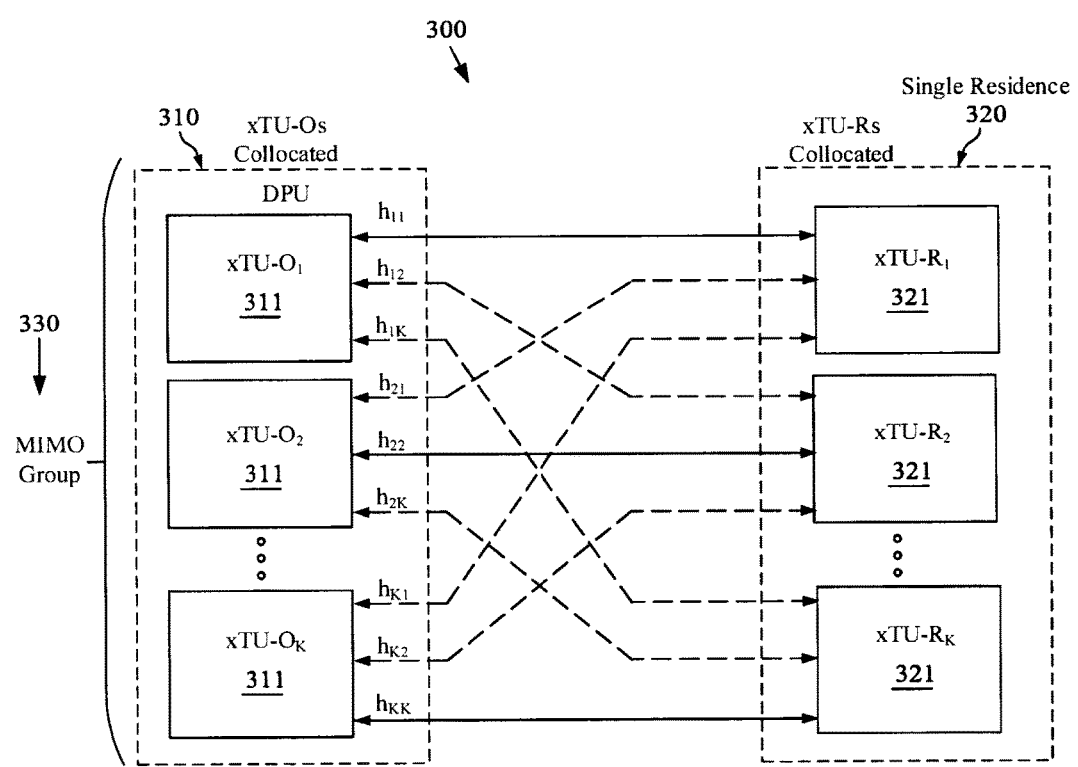
FIG. 3 is a schematic diagram of an embodiment of a MIMO DSL system.

FIG. 3 is a schematic diagram of an embodiment of a MIMO DSL system 300. The system 300 is similar to the MIMO DSL system described in G Tauböck and W Henkel, "MIMO systems in the subscriber-line network," 5th International OFDM Workshop, 2000, which is incorporated by reference. Unlike the systems 100 and 200, the system 300 serves a plurality of xTU-Rs 321 similar to the xTU-Rs 131 and 231 collocated at a single residence 320. The system 300 comprises a plurality of xTU-Os 311 similar to the xTU-Os 111 and 211 and further comprise a plurality of xTU-Rs 321 similar to the xTU-Rs 231. The xTU-Os 311 are coupled to the XTU-Rs 321 via subscriber lines similar to the subscriber lines 121 bundled in a cable binder similar to the cable binder 120. The xTU-Os 311 are shown as xTU-$O_1$ to xTU-$O_K$ and collocated at a DPU 310 similar to the DPUs 110 and 210. The xTU-Rs 321 are shown as xTU-$R_1$ to xTU-$R_K$. The solid lines represent direct channels from a given xTU-O 311 to a corresponding xTU-R 321. The dashed lines represent FEXT channels between the xTU-Os 311 and the xTU-Rs 321. The system 300 experiences similar FEXT as in the system 200. However, the collocation of the xTU-Os 311 and the collocation of the xTU-Rs 321 enable the use of MIMO processing at both the xTU-Os 311 and the xTU-Rs 321 to utilize the FEXT instead of cancelling the FEXT, as described more fully. The collocated XTU-Os 311 and the collocated xTU-Rs 321 are referred to as a MIMO group 330. The channels $h_{ij}$ for $1 \le i \le K$ and $1 \le j \le K$ within a MIMO group 330 are referred to as MIMO channels. FEXT among adjacent subscriber lines are typically stronger at high frequencies such as above 50 MHz to 100 MHz. When FEXT is strong, MIMO processing may significantly improve system performance, for example, by a few decibels (dBs). It should be noted that MIMO processing may be used in conjunction with vectoring-based FEXT cancellation, as described more fully below.

Figure 4:
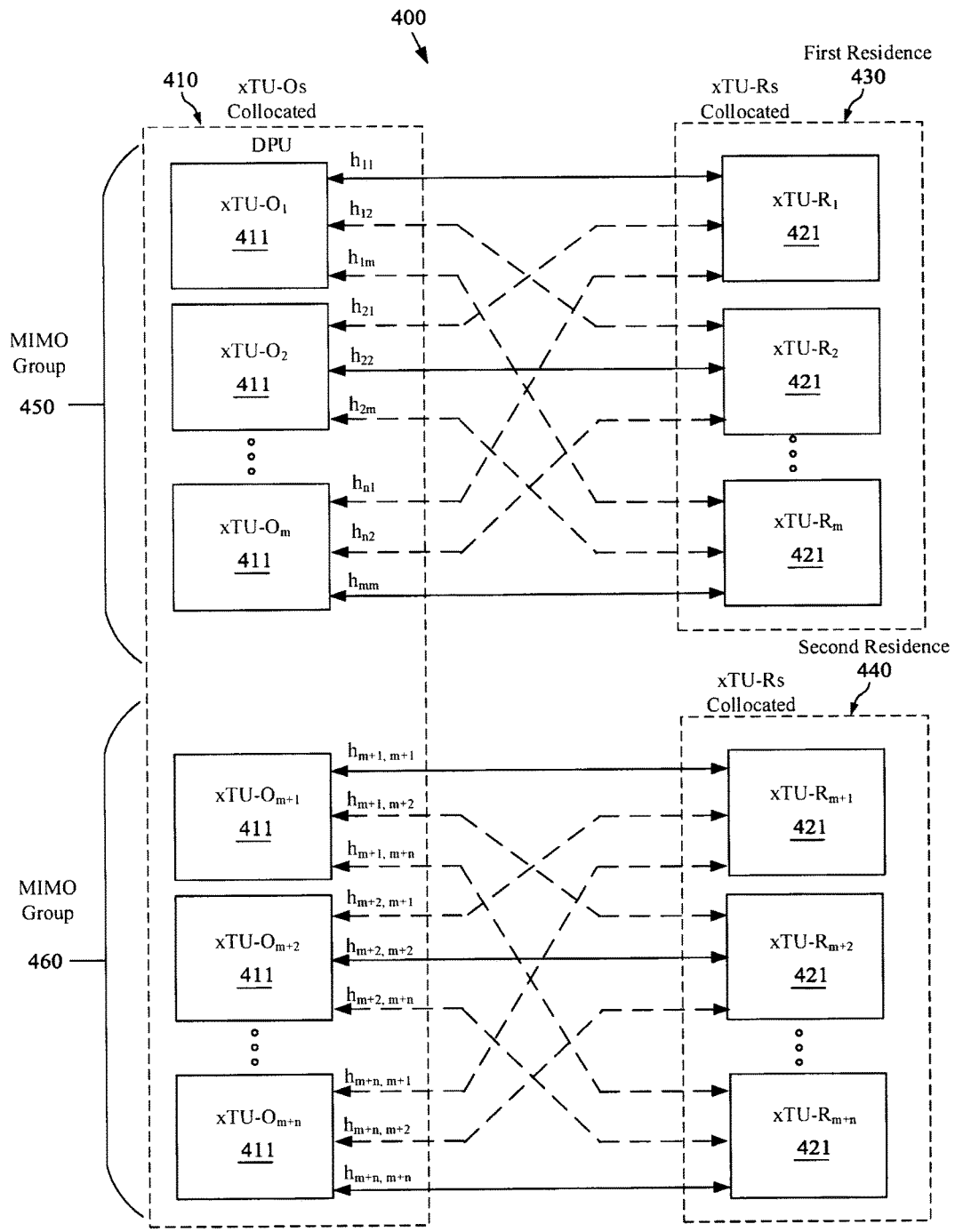
FIG. 4 is a schematic diagram of an embodiment of a MU-MIMO DSL system.

FIG. 4 is a schematic diagram of an embodiment of a MU-MIMO DSL system 400.

The system 400 is similar to the system 300, but serves multiple residences 430 and 440 each having multiple subscriber lines similar to the subscriber lines 121. The system 400 comprises a plurality of xTU-Os 411 similar to the xTU-Os 111, 211, and 311 and a plurality of xTU-Rs 421 similar to the xTU-Rs 131, 231, and 321. The xTU-Os 411 are collocated at a DPU 410 similar to the DPUs 110, 210, and 310. A first group of xTU-Rs 421 shown as xTU-R$_1$ to xTU-R$_m$ are collocated at a first residence 430 each served by a corresponding xTU-O 411 shown as xTU-O$_1$ to xTU-O$_m$. Thus, the first group of xTU-Rs 421 and corresponding xTU-Os 411 form a MIMO group 450 comprising m number of channels. A second group of xTU-Rs 421 shown as xTU-R$_{m+1}$ to xTU-R$_{m+n}$ are collocated at a second residence 440 each served by a corresponding xTU-O 411 shown as xTU-O$_{m+1}$ to xTU-O$_{m+n}$. Similarly, the second group of xTU-Rs 421 and corresponding xTU-Os 411 form a MIMO group 460 comprising n number of channels. To keep FIG. 4 simple and understandable not all the interconnection of FEXT channels are shown by dashed lines. However, every xTU-O 411 is connected to every xTU-R 421. FEXT within a MIMO group is typically stronger than FEXT across MIMO groups. Therefore, utilizing FEXT within a MIMO group rather than cancelling the FEXT may improve system performance, as described more fully below. It should be noted that the system 400 may further comprise additional collocated and/or non-collocated xTU-Rs similar to the xTU-Rs 421.

Figure 5A:
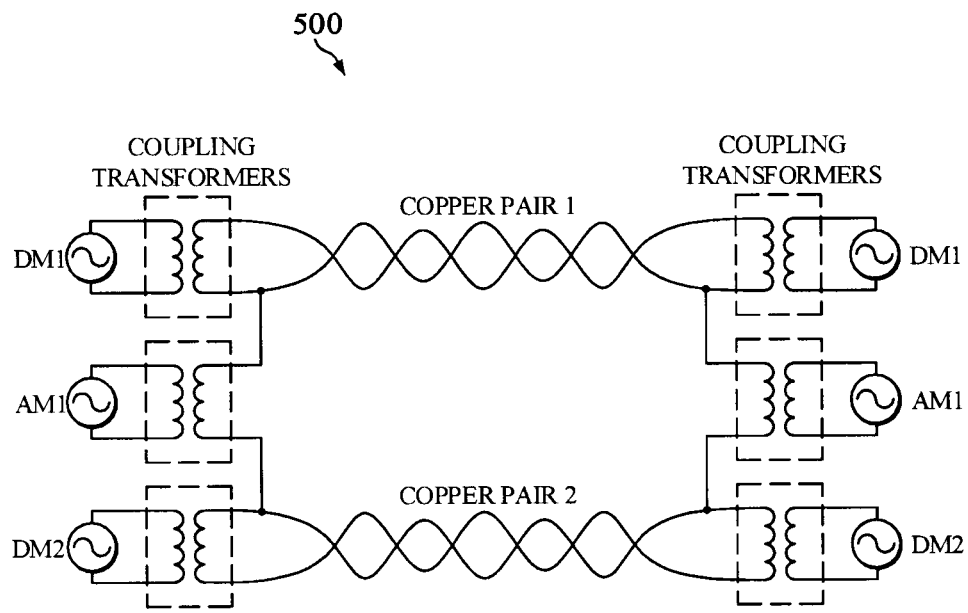
FIGS. 5A and 5B illustrate an embodiment of copper wire pair configurations used to create three channels from two pairs of copper wires.
Figure 5B:
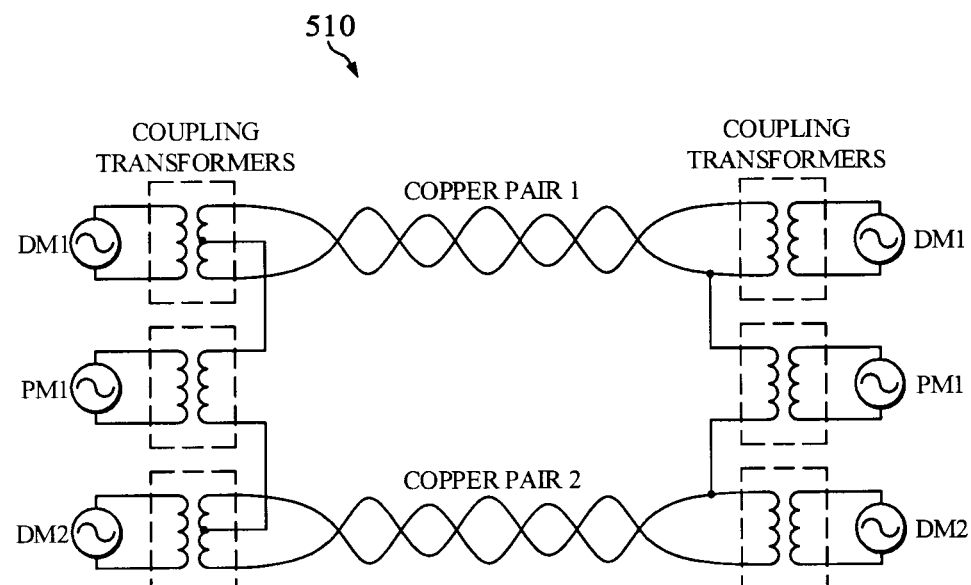

FIGS. 5A and 5B illustrate an embodiment of copper wire pair configurations 500 and 510 used to create three channels from two pairs of copper wires. The configurations 500 and 510 may be employed by the systems 100, 200, 300, and 400. Each pair of copper wires corresponds to a subscriber line 121. Most residences and businesses in the United States and some other countries are connected by two or more copper pairs to the so-called "service terminal" or "pedestals," even though only one pair may be active. Using two pairs, three channels are available. In general, with N-pairs, there are 2N wires. Assuming one wire is used as a reference or common ground, there are 2N−1 channels available. As shown in FIGS. 5A and 5B, there are different ways of creating 2N−1 channels from N pairs. For example, 2N−1 channels may be created from N pairs by keeping N differential modes (DM) and creating N−1 alternative modes (AM) as shown in FIG. 5A for N=2. The alternative modes are created by connecting the secondary of the coupling transformers to one wire of each copper pair. In another method, N differential modes and N−1 phantom modes (PM) are created. The phantom mode is a differential mode channel created from the common modes of the two copper pairs as shown in FIG. 5B. In FIG. 5B, the center-taps of the secondary of the coupling transformers are used to create the phantom mode (PM1). N−1 phantom modes may be created from N pairs, for N>2, similar to the methods shown in FIGS. 5A and 5B. The FEXT egress and ingress level of alternative or phantom modes into differential mode and other alternative or phantom modes in practical cables are high. However, MIMO processing may utilize the strong FEXT and gain channel diversity to improve system performance as described more fully below. Since N wire pairs (lines) may represent 2N−1 channels, the following embodiments describe MIMO processing and FEXT mitigation in terms of channels instead of lines.

Figure 6:
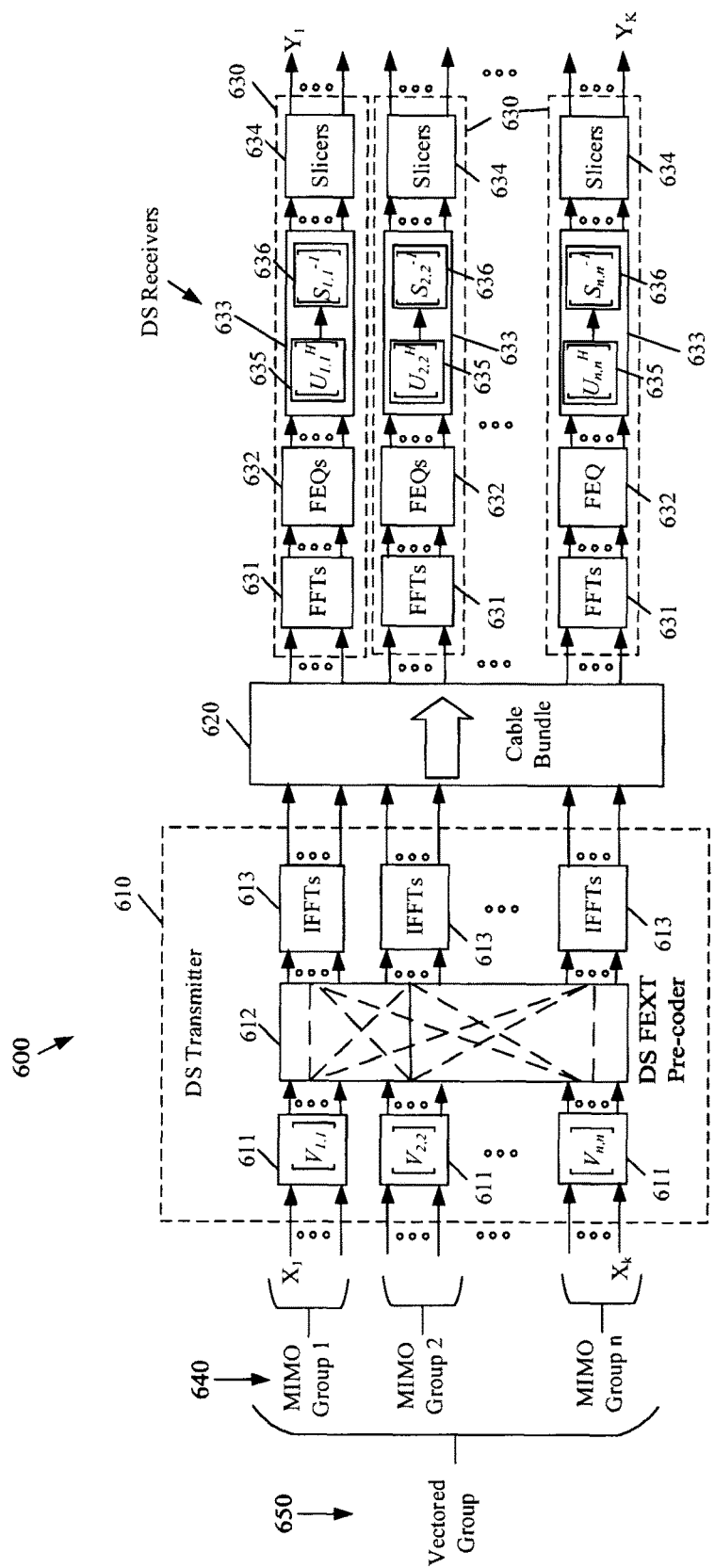
FIG. 6 is a schematic diagram of an embodiment of a MU-MIMO DSL system in a DS direction.

FIG. 6 is a schematic diagram of an embodiment of a MU-MIMO DSL system 600 in a DS direction. The system 600 is similar to the system 400 and illustrates a detailed view of MU-MIMO processing at collocated xTU-Os 411 and the collocated xTU-Rs 421 and a detailed view of vectored-FEXT mitigation at the collocated xTU-Os 411. The system 600 comprises a DS transmitter 610 coupled to a plurality of DS receivers 630 via a cable bundle 620. The cable bundle 620 comprises subscriber lines similar to the subscriber lines 121. The cable bundle 620 generates a plurality of DS channels from the DS transmitter 610 to the DS receivers 630, where the DS channels serving a subscriber may be in differential modes only or in any of the configurations 500 and 510. The DS transmitter 610 forms the transmitting portions of the collocated xTU-Os. Each DS receiver 630 forms the receiving portions of the xTU-Rs collocated at a single residence such as the residences 320, 430, and 440. The DS transmitter 610 comprises a plurality of MIMO pre-coders 611, a DS FEXT pre-coder 612, and a plurality of IFFT units 613. The MIMO pre-coders 611 are shown as $[V_{1,1}]$ to $[V_{n,n}]$, which are representations of MIMO pre-coding matrix coefficients, as described more fully below. Each DS receiver 630 comprises a plurality of FFT units 631, a plurality of FEQs 632, a plurality of MIMO post-coders 633, and a plurality of slicers 634. Each DS receiver 630 and a corresponding portion of the DS transmitter 610 form a MIMO group 640 similar to the MIMO groups 330, 450, and 460. The MIMO post-coders 633 each comprising first sub-block 635 coupled to a second sub-block 636. The first sub-blocks 635 are shown as $[U_{1,1}^H]$ to $[U_{n,n}^H]$ and the second sub-blocks 636 are shown as $[S_{1,1}^{-1}]$ to $[S_{n,n}^{-1}]$, where $[U_{1,1}^H]$ to $[U_{n,n}^H]$ and $[S_{1,1}^{-1}]$ to $[S_{n,n}^{-1}]$, are representations of MIMO post-coding matrix coefficients, as described more fully below.

The system 600 further comprises n number of MIMO groups 640. For example, each $i^{th}$ MIMO group 640 comprises $m_i$ number of channels. Then, the total number of channels, denoted as K, in the system 600 is shown as follows:

$$K = \Sigma_{i=1}^{i=n} m_i \qquad (2)$$

It should be noted that in order to apply MIMO processing, a system having K channels may serve a maximum of K−1 users so that at least one user is served by more than one channel.

The DS transmitter 610 is configured to receive encoded signals carrying DS modulation symbols or frequency-domain constellations for the K channels, denoted as $X_1$ to $X_K$. In a digital implementation, $X_1$ to $X_K$ may be complex numbers. Each MIMO pre-coder 611 is configured to jointly pre-code the DS modulation symbols of all channels within a corresponding MIMO group 640 for MIMO processing. The K channels or the n MIMO groups form a vectored group 650 similar to the vectored group 240. The DS FEXT pre-coder 612 is coupled to the MIMO pre-coders 611 and configured to jointly pre-code all MIMO pre-coded symbols of all MIMO groups 640 for vectored DS FEXT pre-compensation. The IFFT units 613 are coupled to the DS FEXT pre-coder 612. The IFFT units 613 are configured to perform IFFTs on $m_i$ channel signals within a corresponding MIMO group 640. The operations of the MIMO pre-coders 611 and the DS FEXT pre-coder 612 are described more fully below.

The DS receivers 630 are configured to receive signals transmitted by the DS transmitter 610. Each DS receiver 630 receives and processes signals for $m_i$ channels within a corresponding MIMO group 640. At each DS receiver 630, the FFT units 631 are coupled to the FEQs 632, the FEQs 632 are coupled to MIMO post-coders 633, and the MIMO post-coders 633 are coupled to the slicers 634. The FFT units 631 are configured to perform FFTs on the $m_i$ channel signals within a corresponding MIMO group 640. The FEQs 632 are configured to perform frequency-domain channel equalization on the $m_i$ channel signals within a corresponding MIMO group 640. Each MIMO post-coder 633 is configured to perform MIMO post-coding on the $m_i$ channel signals within a corresponding MIMO group 640. In an embodiment, for each line i, the FEQs 632 may be included in the MIMO post-coder 633's $[S_{i,i}^{-1}]$. In such an embodiment, the FEQs 632 comprises FEQ coefficients with values of one. The slicers 634 are configured to recover the transmitted modulation symbols or constellations $X_i$'s from the $m_i$ channel signals within a corresponding MIMO group 640. The operations of the MIMO post-coders 633 are described more fully below.

The MIMO pre-coders 611 and the MIMO post-coders 633 are determined using a matrix decomposition method such as singular-value decomposition (SVD). Assuming synchronization and vectoring, using DMT modulation with CPs long enough for ISI and ICI avoidance, the tones of the DMT are orthogonal to one another and therefore each tone may be processed independently. A DS channel matrix H is defined to represent the DS channels in the system 600 at a given tone as follows:

$$H = \begin{bmatrix} H_{1,1} & \cdots & H_{1,n} \\ \vdots & \ddots & \vdots \\ H_{n,1} & \cdots & H_{n,n} \end{bmatrix} \quad (3)$$

where each component $H_{i,j}$ for $1 \le i \le n$ and $1 \le j \le n$ is a sub-matrix of size $m_i$ by $m_j$ as shown below:

$$H_{i,j} = \begin{bmatrix} h_{i_1,j_1} & \cdots & h_{i_1,j_{m_j}} \\ \vdots & \ddots & \vdots \\ h_{i_{m_i},j_1} & \cdots & h_{i_{m_i},j_{m_j}} \end{bmatrix}_{m_i \times m_j}, \forall i,j \quad (4)$$

where $m_i$ is the number of channels or lines in an $i^{th}$ MIMO group 640 and $\forall$ represents all values of i and j, for example, $1 \le i \le n$ and $1 \le j \le n$. The diagonal blocks of H, $H_{i,i}$, $\forall i$ each represents MIMO channels for an $i^{th}$ MIMO group 640, where the MIMO channels include intra-crosstalk and direct channels of lines within an $i^{th}$ MIMO group 640. The diagonal blocks are also referred to as MIMO channel sub-matrices. The off-diagonal blocks of H, $H_{i,j}$, $i \ne j$ each represents inter-MIMO crosstalk channels between an $i^{th}$ MIMO group 640 and a $j^{th}$ MIMO group 640.

SVD is applied to each MIMO channel sub-matrix as follows:

$$H_{i,i} = U_{i,i} \times S_{i,i} \times V_{i,i}^H, \forall i \quad (5)$$

where $U_{i,i}$ and $V_{i,i}$ are unitary matrices that preserve power, $S_{i,i}$ is a diagonal matrix, and the superscript H represents a conjugate transpose operation.

A DS MIMO channel matrix $H_M$ is defined to represent the MIMO channel sub-matrices $H_{i,i}$ of all MIMO groups 640 as follows:

$$H_M = \begin{bmatrix} H_{1,1} & \cdots & 0 \\ \vdots & \ddots & \\ 0 & \cdots & H_{n,n} \end{bmatrix} \quad (6)$$

and the matrices $U_{i,i}$, $V_{i,i}$, and $S_i$, are obtained from SVD as shown below:

$$U = \begin{bmatrix} U_{1,1} & \cdots & 0 \\ \vdots & \ddots & \\ 0 & \cdots & U_{n,n} \end{bmatrix}, S = \begin{bmatrix} S_{1,1} & \cdots & 0 \\ \vdots & \ddots & \\ 0 & \cdots & S_{n,n} \end{bmatrix}, \quad (7)$$

$$V = \begin{bmatrix} V_{1,1} & \cdots & 0 \\ \vdots & \ddots & \\ 0 & \cdots & V_{n,n} \end{bmatrix}$$

The matrix V is used to construct the MIMO pre-coders 611 at the DS transmitter 610. Each MIMO pre-coder 611 multiplies the encoded signals or DS modulation symbols by a corresponding $V_{i,j}$. The matrices S and U are used to construct the MIMO post-coders 633. Each MIMO post-coder 633 multiplies corresponding FEQ 632 output signals by $S_{i,i}^{-1} \times U_{i,i}^H$, where the superscript −1 represents a matrix inverse operation. This multiplication of FEQ 632 output signals by $S_{i,i}^{-1} \times U_{i,i}^H$ is equivalent to multiplying FEQ 632 output signals by $U_{i,i}^H$ followed by a multiplication by $S_{i,j}^{-1}$.

The DS FEXT pre-coder 612 is constructed from a DS FEXT pre-coding matrix, denoted as P, where the DS FEXT pre-coder 612 multiples the MIMO pre-coder 611 output signals of all MIMO groups 640 by the DS FEXT pre-coding matrix P. In order for signals received at the DS receivers 630 to be equal to signals transmitted by the DS transmitter 610, operations performed by the MIMO pre-coders 611, the DS FEXT pre-coder 612, and the MIMO post-coders 633 and the channels generated by the cable bundle 620 satisfy the following condition:

$$S^{-1} \times U^H \times H \times P \times V = I_{K \times K} \quad (8)$$

where $I_{K \times K}$ is an identity matrix. Thus, the DS FEXT pre-coding matrix P is expressed as shown below:

$$P = (S^{-1} \cdot U^H \times H)^{-1} \times V^{-1} \quad (9)$$
$$= H^{-1} \times H_M$$

It should be noted that equations (8) and (9) do not account for noise in the channels.

The end-to-end model of the system 600 is shown below:

$$Y = S^{-1} \times U^H \times (H \times P \times V \times X + F \times N) \quad (10)$$

where Y is a column vector $[Y_1, Y_2, \ldots Y_K]$ representing outputs at the slicers 634, X is a column vector $[X_1, X_2, \ldots X_K]$ representing inputs at the DS transmitter 610, F represents FEQ coefficients of the FEQs 632, and N represents additive white Gaussian noise (AWGN).

The computation of the DS FEXT pre-coding matrix P as shown in equation (9) may be intensive when the number of channels K is large. In an embodiment, a two-step approach is used to reduce computation complexity. In the two-step approach, the channel matrix H shown in equation (3) is re-estimated after determining the MIMO pre-coding matrices $V_{i,j}$ and the MIMO post-coding matrices $S_{i,i}^{-1}U_{i,i}^{H}$ and applying the MIMO pre-coder 611 at the DS transmitter 610 and the MIMO post-coders 633 at the DS receivers 630. To illustrate the reduced matrix P computation, K is set to a value of 8, indicating 8 DS channels, and n is set to a value of 3, indicating 3 MIMO groups 640. For example, channels 1 to 3 form a first MIMO group 640, channels 4 and 5 form a second MIMO group 640, channels 6 and 7 form a third MIMO group 640, and channel 8 is single non-MIMO channel. The original channel matrix H shown in equation (11) of FIG. 6A. In Equation (11) of FIG. 6A, $m_{ij}$ for $1 \leq i \leq 3$ and $1 \leq j \leq 3$ represents direct channels and intra-crosstalk in the first MIMO group 640, $n_{ij}$ for $4 \leq i \leq 5$ and $4 \leq j \leq 5$ represent direct channels and intra-crosstalk in the second MIMO group 640, $l_{ij}$ for $6 \leq i \leq 7$ and $6 \leq j \leq 7$ represents direct channels and intra-crosstalk in the third MIMO group 640, $h_{88}$ represents the direct channel for the last channel, and the remaining $h_{ij}$ for $1 \leq i \leq 8$ and $1 \leq j \leq 8$ represents FEXT channels across all the MIMO groups 640. The dashed rectangles in equation (11) illustrate the three MIMO groups 640.

A MIMO channel sub-matrix is defined for each MIMO group 640 and SVD is applied to each MIMO channel sub-matrix similar to equation (12) as shown in FIG. 6B. In Equation (12) of FIG. 6B, M, N, and L represent the MIMO channel matrices of the first, second, and third MIMO groups 640, respectively. The MIMO pre-coders 611 in the first, second, and third MIMO groups 640, multiply corresponding DS symbols by $v_M$, $V_N$, and $v_L$, respectively. In the MIMO post-coders 633 in the first, second, and third MIMO groups 640, multiply corresponding FEQs' 632 output signals by $S_M^{-1} \times U_M^H$, $S_N^{-1} \times U_N^H$, and $S_L^{-1} \times U_L^H$, respectively.

After applying the MIMO pre-coders 611 and the MIMO post-coders 633, the channel matrix H is re-estimated while the xTU-Os and the xTU-Rs transmit training signals using similar mechanisms described above. The re-estimated channel matrix, denoted as $H_2$, as shown in FIG. 6C. In the equation shown in FIG. 6C, $m'_{ij}$ for $1 \leq i \leq 3$ and $1 \leq j \leq 3$, $n'_{ij}$ for $4 \leq i \leq 5$ and $4 \leq j \leq 5$, and $l'_{ij}$ for $6 \leq i \leq 7$ and $6 \leq j \leq 7$ are re-estimated channels of the first, second, and third MIMO groups 640, and $h'_{ij}$ for $1 \leq i \leq 8$ and $1 \leq j \leq 8$ are re-estimated FEXT channels among the MIMO groups 640. As shown, the diagonal components of the MIMO channel sub-matrices M, N, and L (e.g., $m'_{ij}$ for $1 \leq i \leq 3$ and $1 \leq j \leq 3$, $n'_{ij}$ for $4 \leq i \leq 5$ and $4j \leq 5$, and $l'_{ij}$ for $6 \leq i \leq 7$ and $6 \leq j \leq 7$) comprise values of 1 after applying MIMO pre-coding and the MIMO post-coding. The off-diagonal components of the MIMO channel sub-matrices M N, and L (e.g., $m'_{ij}$ for $1 \leq i \leq 3$ and $1 \leq j \leq 3$, $n'_{ij}$ for $4 \leq i \leq 5$ and $4 \leq j \leq 5$, and $l'_{ij}$ for $6 \leq i \leq 7$ and $6 \leq j \leq 7$) may comprise values of zeros or close to zeros after applying MIMO pre-coding and the MIMO post-coding. The non-zero values are due to noise or channel estimation error in $H_2$.

The DS FEXT pre-coding matrix P is recomputed by setting the off-diagonal elements $m'_{ij}$, $n'_{ij}$, and $l'_{ij}$, where $i \neq j$, of the MIMO groups 640 to values of zeros and inverting the re-estimated channel matrix $H_2$ as follows:

$$P = H_2^{-1} \quad (14)$$

Comparing equation (9) to equation (14), equation (14) is less computationally intensive. It should be noted that equations (11) to (14) may be extended to include any number of channels and any number of MIMO groups. In general, the diagonal blocks of $H_2$ are identity matrices and the off-diagonal blocks of $H_2$ are changed from the off-diagonal blocks of H.

In an embodiment, the DS receivers 630 compute channel estimates for direct channels and FEXT channels in a DS direction (e.g., $H_{i,j}$), performs SVD to determine MIMO pre-coding matrices (e.g., $V_{i,j}$) and MIMO post-coding matrices (e.g., $S_{i,i}^{-1} \times U_{i,i}^{H}$) according to equation (5), and sends the MIMO pre-coding matrices and the channel estimates to the DS transmitter 610. The DS transmitter 610 computes a FEXT pre-coding matrix (e.g., P) based on the channel estimates received from the DS receivers 630 according to equation (9) or (14).

Figure 7:
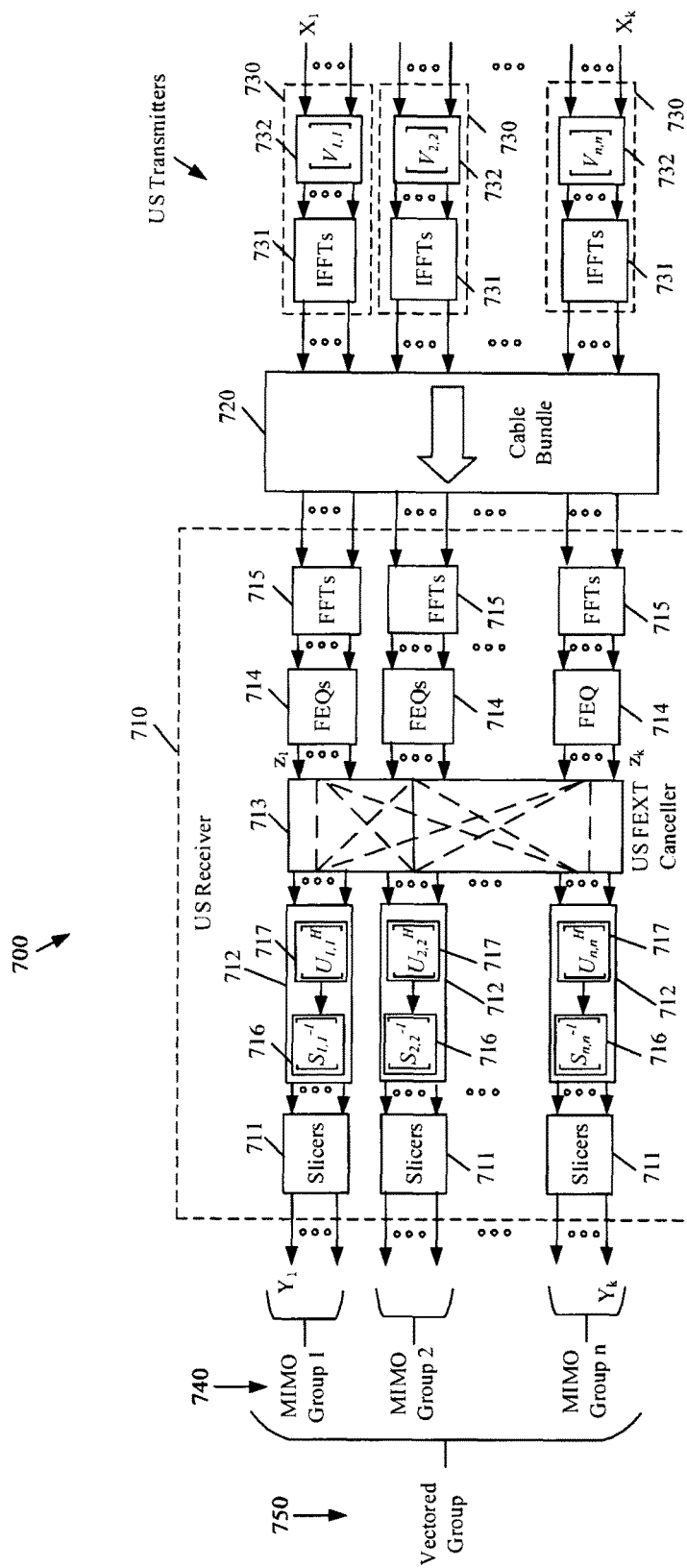
FIG. 7 is a schematic diagram of an embodiment of a MU-MIMO DSL system in a US direction.

FIG. 7 is a schematic diagram of an embodiment of a MU-MIMO DSL system 700 in a US direction. The system 700 is similar to the system 400 and illustrates a detailed view of MIMO processing at collocated xTU-Os 411 and the collocated xTU-Rs 421 and a detailed view of vectored-FEXT mitigation at the collocated xTU-Os 411. The system 700 comprises a similar structure as the system 600. However, instead of performing FEXT pre-coding, the system 700 performs FEXT cancellation, since US transmitters 730 are not collocated. The system 700 comprises a US receiver 710 coupled to the US transmitters 730 via a cable bundle 720 similar to the cable bundle 620. The cable bundle 720 generates a plurality of US channels from the US transmitters 730 to the US receiver 710, where the US channels may be in differential mode or any of the configurations 500 and 510. The US receiver 710 forms the receiving portions of the collocated xTU-Os. Each US transmitter 730 forms the transmitting portions of the xTU-Rs collocated at a single residence such as the residences 230, 320, 430, and 440.

The US receiver 710 comprises a plurality of slicers 711, a plurality of MIMO post-coders 712, a US FEXT canceller 713, a plurality of FEQs 714, and a plurality of FFT units 715. The slicers 711, the FEQs 714, and the FFT units 715 are similar to the slicers 634, the FEQs 632, and the FFT units 631, respectively. The MIMO post-coders 712 are similar to the MIMO post-coders 633 each comprising a first sub-block 717 similar to the first sub-block 635 and a second sub-block 716 similar to the second sub-block 636. The first sub-blocks 717 are shown as $[U_{1,1}^{H}]$ to $[U_{n,n}^{H}]$ and the second sub-blocks 716 are shown as $[S_{1,1}^{-1}]$ to $[S_{n,n}^{-1}]$. The slicers 711, the MIMO post-coders 712, the FEQs 714, and the FFT units 715 are arranged in a similar order as the DS receivers 630. The additional US FEXT canceller 713 is positioned between the FEQs 714 and the MIMO post-coders 712. Each US transmitter 730 comprises a plurality of IFFT units 731 similar to the IFFT units 613 and MIMO pre-coders 732 similar to the MIMO pre-coders 611 and are shown as $[V_{1,1}]$ to $[V_{n,n}]$. The IFFT units 731 and the MIMO pre-coders 732 are arranged in a similar order as the DS transmitter 610. However, there is no US FEXT pre-coding at the non-collocated US transmitters 730. Each US transmitter 730 and a corresponding portion of the US receiver 710 form a MIMO group 740 similar to the MIMO groups 330, 450, 460, and 640. The US channels across all the MIMO groups 740 to form a vectored group 750 similar to the vectored groups 240 and 650. The US FEXT canceller 713 is configured to perform vectored US FEXT cancellation on frequency-domain equalized signals output by the FEQs 714.

A US channel matrix H similar to the DS channel matrix H shown in equation (3) is defined to represent the US channels in the system 700. The system 700 performs similar MIMO processing as the system 600 and determines MIMO pre-coding matrices for the MIMO pre-coders 732 and MIMO post-coding matrices for the MIMO post-coders 712 using similar mechanisms as the system 600. A US MIMO channel matrix $H_M$ is defined as shown in equation (6) and SVD is performed as shown in equation (5) to obtain unitary matrices U and V and diagonal matrix S as shown in equation (7). Each MIMO pre-coder 732 multiplies encoded signals or US modulation symbols, denoted as $X_1$ to $X_K$, by a corresponding $V_{i,i}$. This operation for the entire MU-MIMO system is represented by V×X where V is defined in equation (7). Each MIMO post-coder 712 multiplies corresponding US FEXT canceller 713 output signals, denoted as $z_1$ to $z_K$, which forms a vector $Z_F$, by $S_{i,j}^{-1} \times U_{i,i}^H$. This operation for the entire MU-MIMO system is represented by $S^{-1} \times U^H \times Z_F$, where S and U are defined in equation (7).

The US FEXT canceller 713 is constructed from a US FEXT cancellation matrix, denoted as C, where the US FEXT canceller 713 multiples the FEQ 714 output signals of all channels by the US FEXT cancellation matrix C. In order for signals recovered by the US receiver 710 to be equal to signals transmitted by the US transmitters 730, operations performed by the MIMO pre-coders 732, the US FEXT canceller 713, the MIMO post-coders 712, and the US channels generated by the cable bundle 720 should satisfy the following condition:

$$S^{-1} \times U^H \times C \times H \times V = I_{K \times K} \quad (15)$$

Thus, the US FEXT cancellation matrix C is expressed as shown below:

$$C = U \times S \times V^H \times H^{-1} \quad (16)$$
$$= H_M \times H^{-1}$$

It should be noted equation (16) does not account for noise in the channels.

The end-to-end model of the system 700 is shown below:

$$Y = S^{-1} \times U^H \times C \times (H \times V \times X + F \times N) \quad (17)$$

where Y is a column vector $[Y_1, Y_2, \ldots Y_K]$ representing outputs at the slicers 711, X is a column vector $[X_1, X_2, \ldots X_K]$ representing inputs at the US transmitters 730, F represents FEQ coefficients of the FEQs 714, and N represents AWGN noise.

In an embodiment, the two-step approach described above is applied to reduce computational complexity of the US FEXT cancellation matrix C shown in equation (16). In such an embodiment, the US channel matrix H is re-estimated after applying the MIMO pre-coders 732 and the MIMO post-coders 712 as shown in equations (11) to (14). Thus, the US FEXT cancellation matrix C is computed as follows:

$$C = H_2^{-1} \quad (18)$$

In an embodiment, the US receiver 710 computes channel estimates for direct channels and FEXT channels in a US direction (e.g., $H_{i,j}$), performs SVD to determine MIMO pre-coding matrices (e.g., $V_{i,i}$) and MIMO post-coding matrices (e.g., $S_{i,i}^{-1} \times U_{i,i}^H$) according to equation (5), sends the MIMO pre-coding matrices to the US transmitter 730, and computes a FEXT cancellation matrix (e.g., C) according to equation (16) or (18), and sends the MIMO pre-coding matrices to the US transmitters 730.

In an embodiment, a MIMO DSL system such as the systems 300, 400, 600, and 700 uses a GMD method to determine matrix coefficients for MIMO pre-coders such as the MIMO pre-coders 611 and 732, MIMO post-coders such as the MIMO post-coders 633 and 712, DS FEXT pre-coders such as the DS FEXT pre-coder 612, and US FEXT cancellers such as the US FEXT canceller 713. For example, the system comprises a plurality of channels and a plurality of MIMO groups similar to the MIMO groups 330, 450, 460, 640, and 740 formed from the plurality of channels. In such an embodiment, a channel matrix H is defined to represent channels, which may be US channels or DS channels, in the system similar to equation (3) and a MIMO channel sub-matrix $H_{i,i}$ is defined to represent channels within a MIMO group similar to equation (4). Each MIMO channel sub-matrix $H_{i,i}$ is decomposed using GMD as follows:

$$H_{i,i} = Q_{i,i} G_{i,i} T_{i,i}^H, \forall i \quad (19)$$

where $Q_{i,i}$ and $T_{i,i}$ are matrices comprising orthonormal columns, and $G_{i,i}$ is a real upper triangular matrix with diagonal entries equal to the geometric mean of the positive singular values of $H_{i,i}$. Similar to the SVD method, the transmitter of each MIMO group such as the DS transmitter 610 and the US transmitters 730 performs MIMO pre-coding by multiplying encoded signals by $T_{i,i}$, and the receiver of each MIMO group such as the DS receivers 630 and the US receiver 710 performs MIMO post-coding by multiplying frequency-domain equalized signals by $G_{i,i}^{-1} \times Q_{i,i}^H$. The DS FEXT pre-coder matrix P is computed as shown in equations (9) or (14) and the US FEXT canceller matrix C is computed as shown in equations (16) or (18). It should be noted that since $G_{i,i}$ is a triangular matrix, the MIMO post-coding may be implemented using a back substitution method to further reduce computational complexity instead of directly computing $G_{i,i}^{-1}$.

In another embodiment, a generalized matrix decomposition method is used to compute the MIMO pre-coding matrices and the MIMO post-coding matrices. For example, the MIMO channel sub-matrices are decomposed as follows:

$$H_{i,i} = A_{i,i} \times W_{i,i} \times B_{i,i}^{-1}, \forall i \quad (20)$$

where $A_{i,i}$, $W_{i,i}$, and $B_{i,i}$ are non-singular matrices. The matrices $A_{i,i}$, $W_{i,i}$, and $B_{i,i}$ may be selected such that matrix inversion may be easily performed. For example, the matrices $A_{i,i}$ and $B_{i,i}$ may be unitary matrices and $W_{i,i}$ may be a diagonal matrix, a triangular matrix, or a Hessenberg matrix. Similar to the SVD and the GMD methods, the transmitter of each MIMO group such as the DS transmitter 610 and the US transmitters 730 performs MIMO pre-coding by multiplying the transmitted signals by $B_{i,i}$, and the receiver of each MIMO group, such as the US receiver 710 and the DS receivers 630, performs MIMO post-coding by multiplying the received signals at FEQ outputs such as the FEQs 632 and 714 outputs by $A_{i,i}^{-1}$ and followed by multiplying the results by $W_{i,i}^{-1}$, $\forall i$. The DS FEXT pre-coder matrix P are computed as shown in equations (9) or (14) and US FEXT canceller matrix C are computed as shown in equations (16) or (18).

In a first embodiment, the matrix in equation (20) is an upper triangular matrix with non-zero diagonal entries. In such an embodiment, a transmitter such as the DS transmitter 610 and the US transmitters 730, applies a nonlinear approach, e.g., Tomlinson-Harashima precoding (THP), to the equation (20). For example, the matrix decomposition is further decomposed as follows:

$$H_{i,i} = (A_{i,i} \times \text{diag}(W_{i,i})) \times ((\text{diag}(W_{i,i}))^{-1} \times W_{i,i}) \times B_{i,i}^{-1}, \forall i \quad (21)$$

where $\text{diag}(W_{i,i})$ represents a diagonal matrix with diagonal entries of $W_{i,i}$. The term $((\text{diag}(W_{i,i}))^{-1} \times W_{i,i}$ in equation (21) is an upper triangular matrix, which may be represented as $\check{W}_{i,i}$, with diagonal entries comprising values of ones as shown below:

$$\tilde{W}_{i,i} = \begin{bmatrix} 1 & w_{1,2} & \cdots & w_{1,m_i} \\ 0 & 1 & \cdots & w_{2,m_i} \\ \cdots & \cdots & \ddots & \cdots \\ 0 & 0 & \cdots & 1 \end{bmatrix} \quad (22)$$

The nonlinear approach is formulated as y=N(x) defined by the matrix $\tilde{W}_{i,i}$, where N represents a nonlinear function, y represents the output of the nonlinear function N, and x represents the input to the nonlinear function N. The nonlinear approach may be computed by selecting a positive bound as shown below:

$$u > 2 \times \max\{|\Re\{x_1\}|, |\Im\{x_1\}|, |\Re\{x_2\}|,$$
$$|\Im\{x_2\}|, \ldots, |\Re\{x_{m_i}\}|, |\Im\{x_{m_i}\}|\} \quad (23)$$

where $\Re\{x_1\}$ and $\Im\{x_i\}$ represent the real and imaginary components of $x_1$ respectively. Subsequently, y may be computed iteratively from the last entry, denoted as $y_n$, to the first entry, denoted as $y_1$, where 1, . . . , $m_i$ represent sample indices, as shown below:

$$y_{m_i} = x_{m_i} \quad (24)$$

$$\begin{cases} \tilde{y}_j = x_j - \sum_{k=j+1}^{m_i} w_{j,k} \times y_k, \, j = m_i - 1, m_i - 2, \ldots, 1 \\ y_j = \left[ -\frac{u}{2} + \left( \Re\{\tilde{y}_j\} + \frac{u}{2} \right) \bmod u \right] + \left[ -\frac{u}{2} + \left( \Im\{\tilde{y}_j\} + \frac{u}{2} \right) \bmod u \right] \times \sqrt{-1}, \\ j = m_i - 1, m_i - 2, \ldots, 1 \end{cases}$$

where j and k represents sample indices, u represents the above selected positive bound, and a mod u represents a modulo operation as shown below:

$$a \bmod u = a - u \times \text{floor}\left(\frac{a}{u}\right) \quad (25)$$

When applying the equation (21), a transmitter performs MIMO pre-coding by applying the nonlinear approach described above in equations (23) and (24) to an input signal, for example, modulation symbols $X_1$ to $X_K$, to produce an intermediate signal, followed by multiplying the intermediate signal by the matrix $B_{i,i}$ to produce pre-coded signals. In the receiver side, each MIMO group such as the US receiver 710 and the DS receivers 630 performs MIMO post-coding by applying the modulo operation shown in equation (25) to received signals at FEQ (e.g., FEQs 632 and 714) outputs, followed by multiplying the modulo operation output signals by $(A_{i,i} \times \text{diag}(W_{i,i}))^{-1} = (\text{diag}(W_{i,i}))^{-1} \times A_{i,i}^{-1}$. When employing the nonlinear approach, the DS FEXT pre-coder matrix P are computed as shown in equations (9) or (14) and US FEXT canceller matrix C are computed as shown in equations (16) or (18).

In a second embodiment, the matrix $W_{i,i}$ in equation (21) is a lower triangular matrix. In such an embodiment, $\tilde{W}_{i,i}$ in equation (22) is as shown below:

$$\tilde{W}_{i,i} = \begin{bmatrix} 1 & 0 & \cdots & 0 \\ w_{2,1} & 1 & \cdots & 0 \\ \cdots & \cdots & \ddots & \cdots \\ w_{m_i,1} & w_{m_i,2} & \cdots & 1 \end{bmatrix} \quad (26)$$

Then the output of the nonlinear approach is obtained iteratively as follows:

$$y_1 = x_1 \quad (27)$$

$$\begin{cases} \tilde{y}_j = x_j - \sum_{k=1}^{j-1} w_{k,j} \times y_k, \, j = 2, 3, \ldots, m_i \\ y_j = \left[ -\frac{u}{2} + \left( \Re\{\tilde{y}_j\} + \frac{u}{2} \right) \bmod u \right] + \left[ -\frac{u}{2} + \left( \Im\{\tilde{y}_j\} + \frac{u}{2} \right) \bmod u \right] \times \sqrt{-1}, \\ j = 2, 3, \ldots, m_i \end{cases}$$

In a third embodiment, the matrix $W_{i,i}$ in equation (21) is either an upper or a lower triangular matrix with non-zero diagonal entries. In such an embodiment, a receiver such as the DS receivers 630 and the US receiver 710 applies a nonlinear approach, e.g., Generalized Decision Feedback Equalization, for MIMO post-coding. A transmitter such as the DS transmitter 610 and the US transmitters 730 performs MIMO precoding by multiplying input signals by $B_{i,i}$. In the receiver side, each MIMO group such as the US receiver 710 and the DS receivers 630 performs MIMO post-coding by first multiplying the FEQ (e.g., FEQs 632 and 714) output signals by $A_{i,i}^{-1}$ and then using $W_{i,i}$ for decision feedback equalization. The DS FEXT pre-coder matrix P is computed as shown in equations (9) or (14) and the US FEXT canceller matrix C is computed as shown in equations (16) or (18).

In yet another embodiment, a generalized matrix decomposition method is used to compute the MIMO pre-coding matrices and the MIMO post-coding matrices. For example, the MIMO channel sub-matrices are decomposed as follows:

$$H_{i,i} = A_{i,i} \times W_{i,i}^A \times W_{i,i}^B \times B_{i,i}^{-1}, \forall i \quad (28)$$

where $A_{i,i}$, $W_{i,i}^A$, $W_{i,i}^B$, and $B_{i,i}$ are non-singular matrices, and the matrices $W_{i,i}^A$ and $W_{i,i}^B$ are any combination of upper and lower triangular matrices with all diagonal entries equal to one. A nonlinear approach, e.g., Tomlinson-Harashima precoding (THP) may be applied at a transmitter such as the DS transmitter 610 and the US transmitters 730. A nonlinear approach, e.g., Generalized Decision Feedback Equalization is applied at a receiver such as the DS receivers 630 and US receiver 710. The transmitter side MIMO precoding comprises using the nonlinear approach corresponding to $W_{i,i}^B$ to pre-code input signals and then uses the matrix $B_{i,i}$ to pre-code the output signals of the nonlinear approach by multiplying the output signals by $B_{i,i}$. In the receiver side, each MIMO group such as the US receiver 710 and the DS receivers 630 performs MIMO post-coding by first applying the modulo operation as shown in equation (25) to received signals at FEQ (e.g., FEQs 632 and 714) outputs, and then multiplying the modulo operation output signals by $A_{i,i}^{-1}$, and then further using $W_{i,i}^A$ for decision feedback equalization. The DS FEXT pre-coder matrix P is computed as shown in equations (9) or (14) and the US FEXT canceller matrix C is computed as shown in equations (16) or (18).

Figure 8:
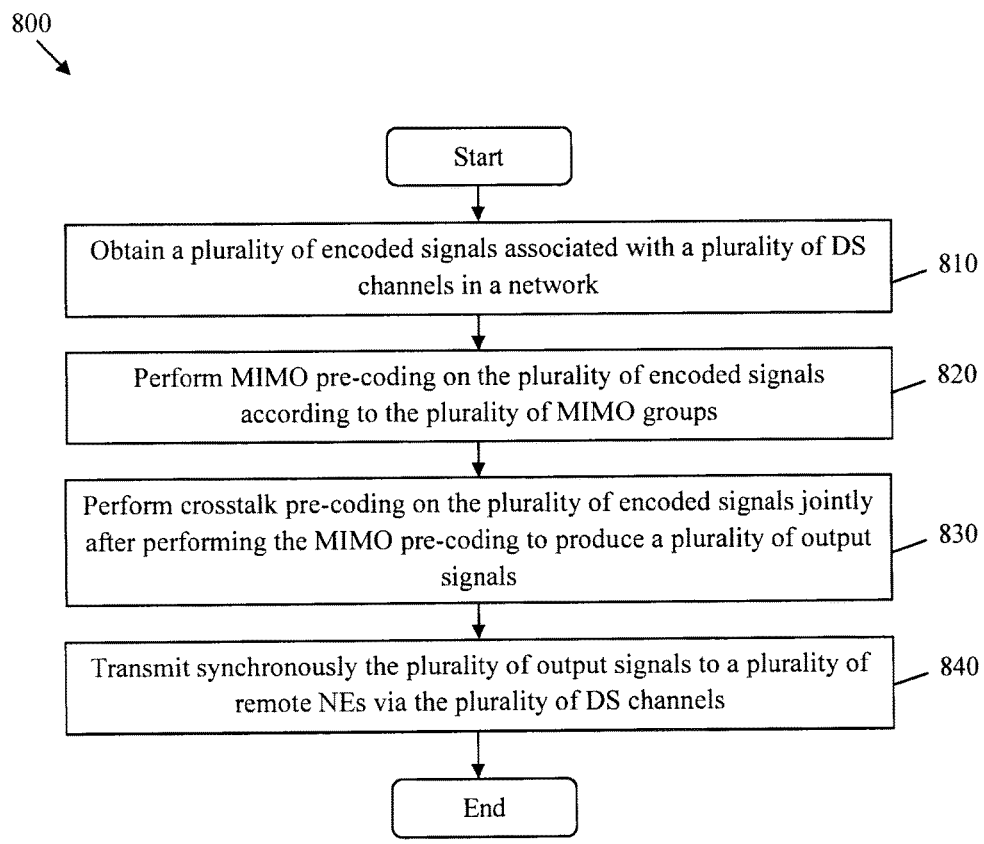
FIG. 8 is a flowchart of an embodiment of a method of performing DS MU-MIMO DSL processing.

FIG. 8 is a flowchart of an embodiment of a method 800 of performing DS MU-MIMO DSL processing. The method 800 is implemented by the DS transmitter 610 and the collocated xTU-Os 311 and 411 or any other DSL office-side equipment such as the DPUs 310 and 410 when communicating with collocated remote NEs such as the xTU-Rs 321 and 421 and the DS receivers 630 in a network such as the systems 300 and 400. At step 810, a plurality of encoded signals associated with a plurality of DS channels in a network is obtained. The plurality of DS channels form a plurality of DS MIMO groups such as the MIMO groups 330, 450, 460, and 640. The plurality of DS channels may be generated from differential mode only or from any of the configurations 500 and 510. The plurality of DS channels is represented by a channel matrix as shown in equation (3). At step 820, MIMO pre-coding is performed on the plurality of encoded signals according to the plurality of MIMO groups, for example, by employing MIMO pre-coders such as the MIMO pre-coders 611. For example, a first subset of the plurality of DS channels form a first DS MIMO group of the plurality of DS MIMO groups and MIMO pre-coding is performed by multiplying a second subset of the plurality of encoded signals associated with the first subset of the plurality DS channels by a MIMO pre-coding matrix computed according to equation (5). At step 830, crosstalk pre-coding is performed on the plurality of encoded signals jointly after performing the MIMO pre-coding to produce a plurality of output signals, for example, by employing a DS FEXT pre-coder such as the DS FEXT pre-coder 612. The crosstalk pre-coding is performed by multiplying the plurality of encoded signals by a FEXT pre-coding matrix computed according to equation (9) or (14). At step 840, the plurality of output signals is substantially synchronously transmitted to a plurality of remote NEs via the plurality of DS channels. The method 800 may be repeated for each subcarrier in the system.

Figure 9:
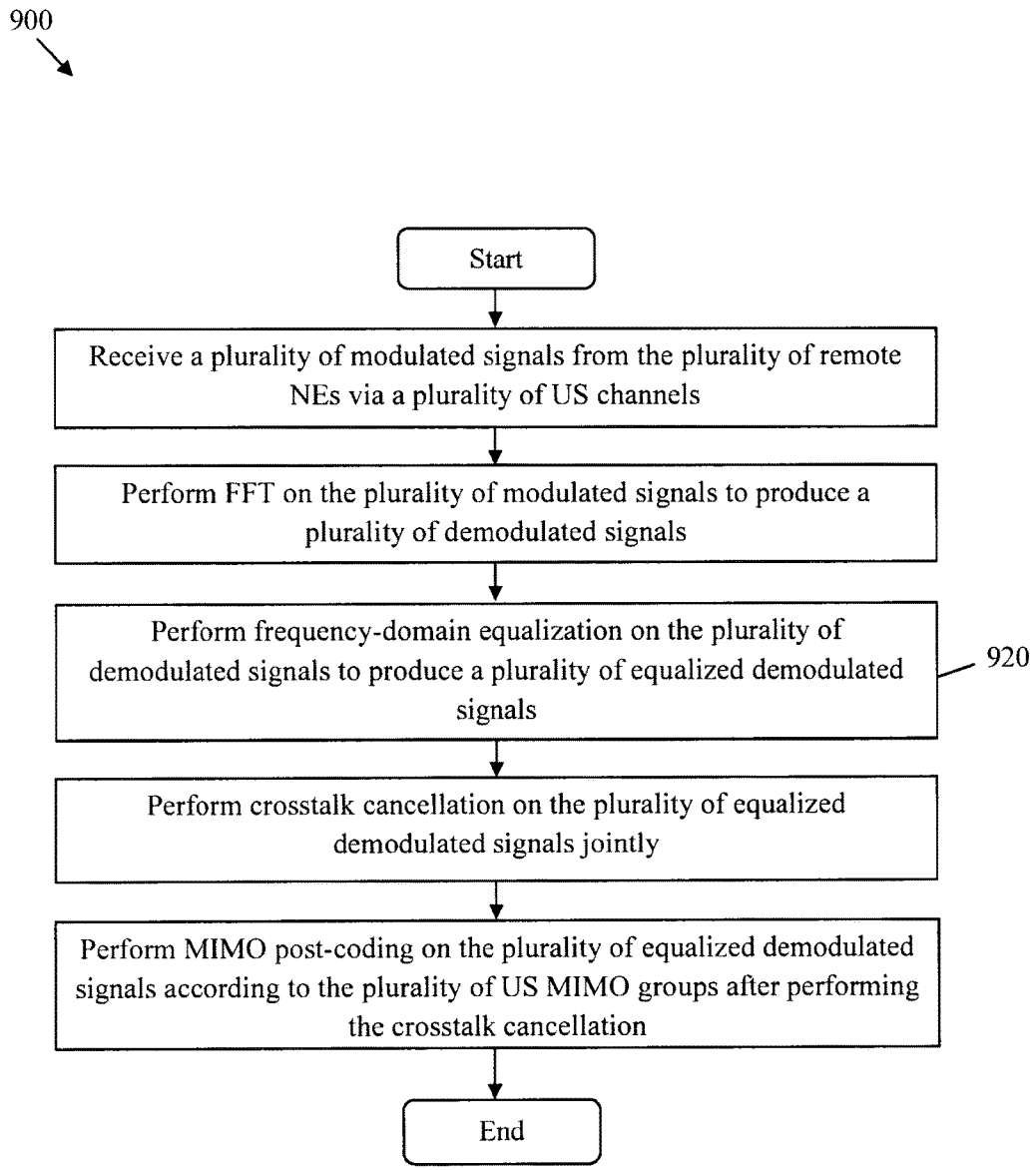
FIG. 9 is a flowchart of an embodiment of a method of performing US MU-MIMO DSL processing.
Figure 10:
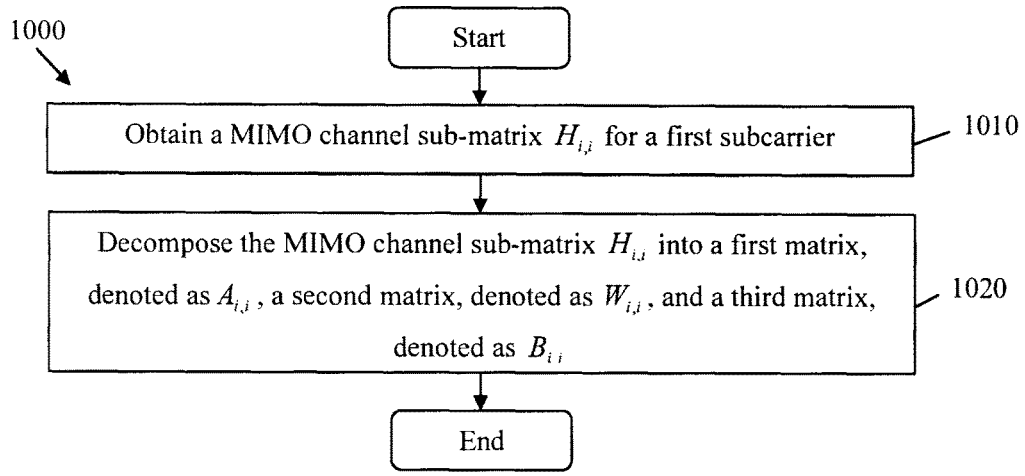
FIG. 10 is a flowchart of an embodiment of a method of determining MU-MIMO matrix coefficients for a MU-MIMO DSL system.

FIG. 9 is a flowchart of an embodiment of a method 900 of performing US MU-MIMO DSL processing. The method 900 is implemented by the US receiver 710 and the collocated xTU-Os 311 and 411 or any other DSL office-side equipment such as the DPUs 310 and 410 when communicating with collocated or non-collocated remote NEs such as the xTU-Rs 321 and 421 and the US receivers 710 in a network such as the systems 300 and 400. At step 910, a plurality of modulated signals is received from the plurality of remote NEs via a plurality of US channels, where the plurality of US channels form a plurality of US MIMO groups such as the MIMO groups 330, 450, 460, and 740. The plurality of modulated signals is MIMO pre-coded, for example, generated by using the MIMO pre-coders 732 and the method 1400, as described more fully below. The plurality of US channels may be generated from differential mode only or from any of the configurations 500 and 510. The plurality of US channels is represented by a channel matrix as shown in equation (3). The first modulated signal is received from the first US channel and the second modulated signal is received from the second US channel. At step 915, FFT is performed on the plurality of the modulated signals to produce a plurality of demodulated signals. At step 920, frequency-domain equalization is performed on the plurality of demodulated signals, for example, by employing FEQs such as the FEQs 714, to produce a plurality of equalized demodulated signals. At step 930, crosstalk cancellation is performed on the plurality of equalized demodulated signals jointly, for example, by using a US FEXT canceller such as the US FEXT canceller 713. The crosstalk cancellation is performed by multiplying the plurality of equalized demodulated signals by a FEXT cancellation matrix computed according to equation (16) or (18). At step 940, MIMO post-coding is performed on the plurality of equalized demodulated signals according to the plurality of US MIMO groups after performing the crosstalk cancellation, for example, by using MIMO post-coders such as the MIMO post-coders 712. For example, a first subset of the plurality of US channels form a first US MIMO group of the plurality of US MIMO groups and the MIMO post-coding is performed by multiplying a second subset of the plurality of equalized demodulated signals associated with the first subset of the plurality of US channels by a MIMO post-coding matrix computed according to equations (4) to (7). The method 900 may be repeated for each subcarrier in the system FIG. 10 is a flowchart of an embodiment of a method 1000 of determining MIMO matrix coefficients for a MU-MIMO DSL system such as the systems 300 and 400. The method 1000 is implemented by the DS transmitter 610, the US transmitter 730, or any other DSL office-side equipment such as the DPUs 310 and 410 when communicating with collocated remote NEs such as the xTU-Rs 321 and 421 and the DS receivers 630 and US receivers in a network such as the systems 300 and 400. The method 1000 is suitable for use in both the US and DS directions. The method 1000 is implemented when determining a MIMO pre-coding matrix for the MIMO pre-coder 611 and 732 and a MIMO post-coding matrix for MIMO post-coders 633 and 712. The method 1000 begins after estimating channels such as channels generated by the cable bundles 620 and 720, for example, according to the channel matrix shown in equation (3). For example, a first subset of the channels forms a first MIMO group. At step 1010, a MIMO channel sub-matrix, denoted as $H_{i,i}$, for a first subcarrier is obtained, where i is a positive integer identifying the MIMO group in the channel matrix. The MIMO channel sub-matrix $H_{i,i}$ comprises diagonal entries representing first direct channel estimates of the first subset of channels at the first subcarrier and off-diagonal entries representing first FEXT channel estimates of the first subset of the channels at the first subcarrier. At step 1020, the MIMO channel sub-matrix $H_{i,i}$ is decomposed into a first matrix, denoted as $A_{i,i}$, a second matrix, denoted as $W_{i,i}$, and a third matrix, denoted as $B_{i,i}$, according to equation (20). The matrix decomposition may also be performed by using SVD as shown in equation (5) or GMD as shown in equation (19). The method 1000 may be repeated for each subcarrier in the system.

Figure 11:
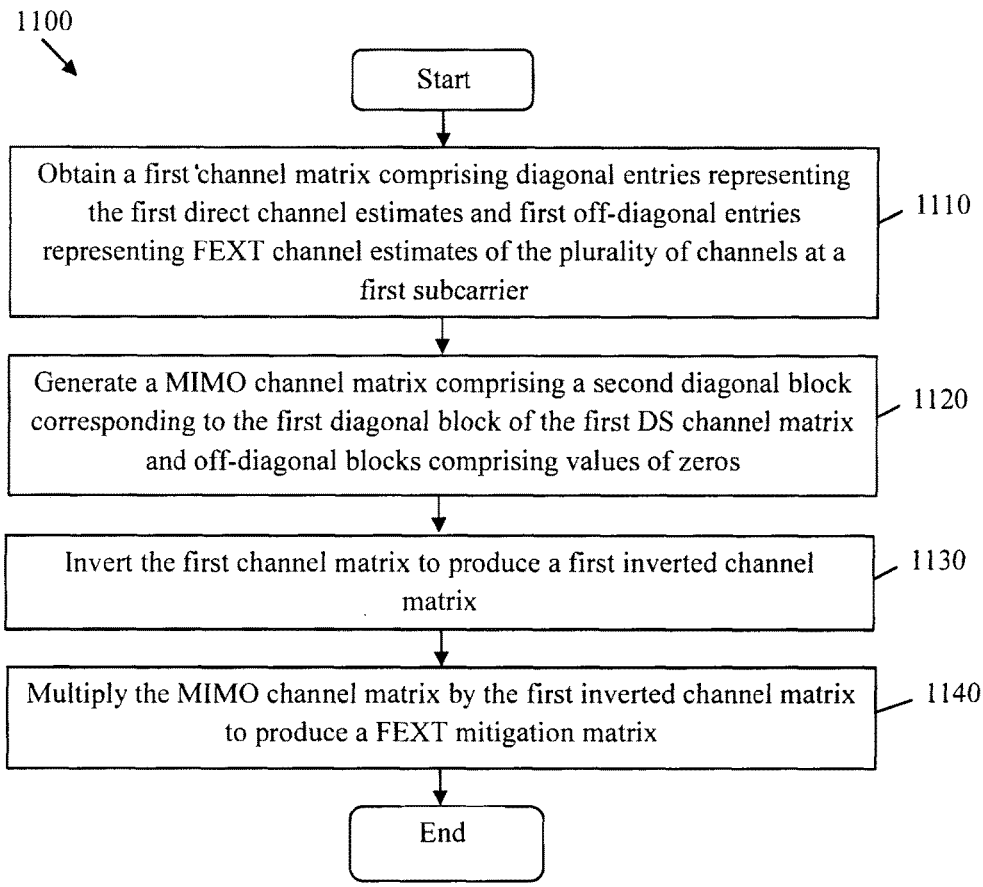
FIG. 11 is a flowchart of an embodiment of a method of determining FEXT mitigation matrix coefficients for a MU-MIMO DSL system.

FIG. 11 is a flowchart of an embodiment of a method 1100 of determining FEXT mitigation matrix coefficients for a MU-MIMO DSL system such as the systems 300 and 400. The method 1100 is implemented by collocated xTU-Os such as the xTU-Os 311 and 411, the DS transmitter 610, the US receiver 710, or any other DSL office-side equipment such as the DPUs 310 and 410 when communicating with collocated xTU-Rs such as the xTU-Rs 321 and 421, the DS receivers 630, and the US transmitters 730 in a system such as the systems 300 and 400. The method 1100 is suitable for use in both the US and DS directions. The method 1100 is implemented when determining a DS FEXT pre-coding matrix for a DS FEXT pre-coder 611 or a US FEXT cancellation matrix for a US FEXT canceller 713. The method 1100 begins after obtaining direct channel estimates and FEXT channel estimates of a plurality of channels such as channels generated by the cable bundles 620 and 720. At step 1110, a first channel matrix, denoted as H, comprising diagonal entries representing the direct channel estimates and first off-diagonal entries representing FEXT channel estimates of the plurality of channels at a first subcarrier is obtained. The first channel matrix His as shown in equation (3). A first diagonal block, denoted as $H_{i,i}$, of the first channel matrix H represents MIMO channels in a MIMO group such as the MIMO groups MIMO groups 330, 450, 460, 640, and 740 within the plurality of channels, where i is a positive integer identifying the MIMO group in the channel matrix. At step 1120, a MIMO channel matrix $H_M$ comprising the first diagonal blocks of the first channel matrix and off-diagonal blocks comprising values of zeros is generated, for example, according to equation (6). At step 1130, the first channel matrix is inverted to produce a first inverted channel matrix $H^{-1}$. At step 1140, the MIMO channel matrix and the first inverted channel matrix are multiplied to produce a FEXT mitigation matrix. In the DS direction, the multiplication is performed according to equation (9) and the FEXT mitigation matrix is used as a DS FEXT pre-coding matrix. In the US direction, the multiplication is performed according to equation (16) and the FEXT mitigation matrix is used as a US FEXT cancellation matrix. In an alternative embodiment, the steps 1130 and 1140 are combined. In the DS direction, the FEXT pre-coding matrix is computed according to an inverse of the first channel matrix H multiplied by the MIMO channel matrix $H_M$, for example, where the multiplication is computed without computation of inversion of H, for example, by employing matrix decomposition. In the US direction, the FEXT cancellation matrix is computed according to the MIMO channel matrix $H_M$ multiplied by an inverse of the first channel matrix H, for example, where the multiplication is computed without computation of inversion of H, for example, by employing matrix decomposition.

Figure 12:
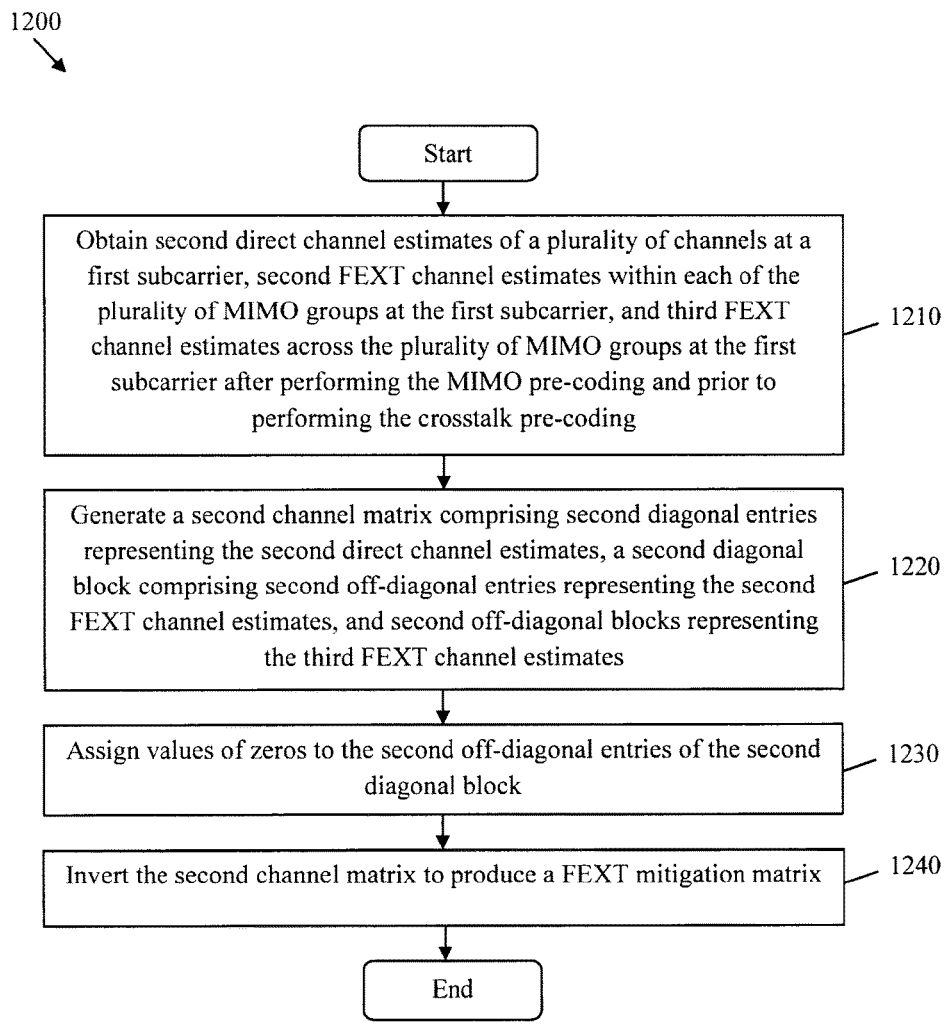
FIG. 12 is a flowchart of another embodiment of a method of determining FEXT mitigation matrix coefficients for a MU-MIMO DSL system.

FIG. 12 is a flowchart of another embodiment of a method 1200 of determining FEXT mitigation matrix coefficients for a MU-MIMO DSL system such as the systems 300 and 400. The method 1200 is implemented by collocated xTU-Os such as the xTU-Os 311 and 411, the DS transmitter 610, the US receiver 710, or any other DSL office-side equipment such as the DPUs 310 and 410 when communicating with collocated xTU-Rs such as the xTU-Rs 321 and 421, the DS receivers 630, and the US transmitters 730 in a system such as the systems 300 and 400. The method 1200 is suitable for use in both the US and DS directions. The method 1200 is an alternative of the method 1100. The method 1200 is implemented when determining a DS FEXT pre-coding matrix for a DS FEXT pre-coder 612 or a US FEXT cancellation matrix for a US FEXT canceller 713. The method 1200 begins after determining MIMO pre-coding matrices and MIMO post coding matrices by employing the method 1000 and while performing MIMO pre-coding and MIMO post-coding, but before performing FEXT pre-coding or FEXT cancellation. At step 1210, second direct channel estimates of a plurality of channels at a first subcarrier, second FEXT channel estimates within each of the plurality of MIMO groups at the first subcarrier, and third FEXT channel estimates across the plurality of MIMO groups at the first subcarrier are obtained after performing MIMO processing and prior to performing crosstalk processing. For example, the second direct channel estimates and the second FEXT channel estimates are computed while a transmitter performs MIMO pre-coding and a corresponding receiver performs MIMO post-coding. Thus, the second direct channel estimates and the second FEXT channel estimates are MIMO pre-coded and MIMO post-coded channel estimates. At step 1220, a second channel matrix comprising second diagonal entries representing the second direct channel estimates, second diagonal blocks each comprising second off-diagonal entries representing corresponding second FEXT channel estimates within each MIMO group, and second off-diagonal blocks representing the third FEXT estimates across the MIMO groups are generated as shown in equation (13). At step 1230, second off-diagonal entries of each second diagonal block are assigned values of zeros. For example, the second off-diagonal entries within a MIMO group correspond to $m'_{ij}$, $n'_{ij}$, and $l'_{ij}$ in equation (13). At step 1240, the second DS channel matrix is inverted to produce a FEXT mitigation matrix. In the DS direction, the FEXT mitigation matrix is used as a DS FEXT pre-coding matrix. In the US direction, the FEXT mitigation matrix is used as a US FEXT cancellation matrix.

Figure 13:
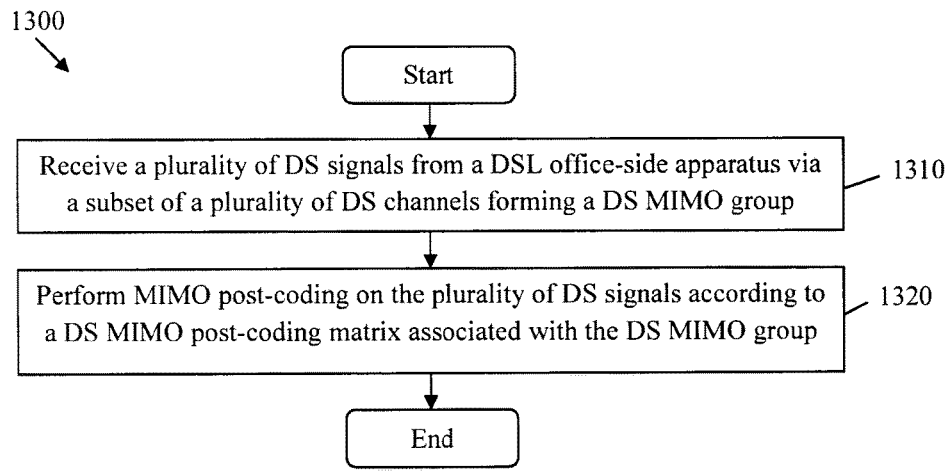
FIG. 13 is a flowchart of another embodiment of a method of performing DS MU-MIMO DSL processing.

FIG. 13 is a flowchart of another embodiment of a method 1300 of performing DS MU-MIMO DSL processing. The method 1300 is implemented by a DSL remote-side apparatus such as the xTU-Rs 321 and 421 collocated at a single residence such as the residences 320, 430, or 440 and the DS receivers 630 when communicating with a DSL office-side equipment such as the collocated xTU-Os 311 and 411, the DPUs 310 and 410 in a system such as the systems 300 and 400. The method 1300 employs similar mechanisms as the DS receivers 630. The collocated xTU-Rs and corresponding collocated xTU-Os form a DS MIMO group such as the MIMO groups 330, 450, 460, and 640. The method 1300 begins after obtaining a MIMO post-coding matrix such as $S_{i,i}^{-1} \times U_{i,i}^{H}$ computed from equation (5), $G_{i,i}^{-1} \times Q_{i,i}^{H}$, computed from equation (19), or $W_{i,i}^{-1} \times A_{i,i}^{-1}$ computed from equation (20) for the DS MIMO group. At step 1310, a plurality of DS signals is received from the DSL office-side apparatus via a subset of a plurality of DS channels forming the DS MIMO group. The plurality of DS signals are pre-coded according to a DS MIMO pre-coding matrix such as $V_{i,i}$ in equation (5), $T_{i,i}$ in equation (19), and $B_{i,i}$ in equation (5) associated with the DS MIMO group at a first subcarrier and according to a DS FEXT pre-coding matrix associated with DS FEXT channels of the plurality of DS channels at the first subcarrier. At step 1320, MIMO post-coding is performed on the plurality of DS signals according to the DS MIMO post-coding matrix associated with the DS MIMO group. The MIMO post-coding is performed after performing frequency domain equalization at the receiver.

Figure 14:
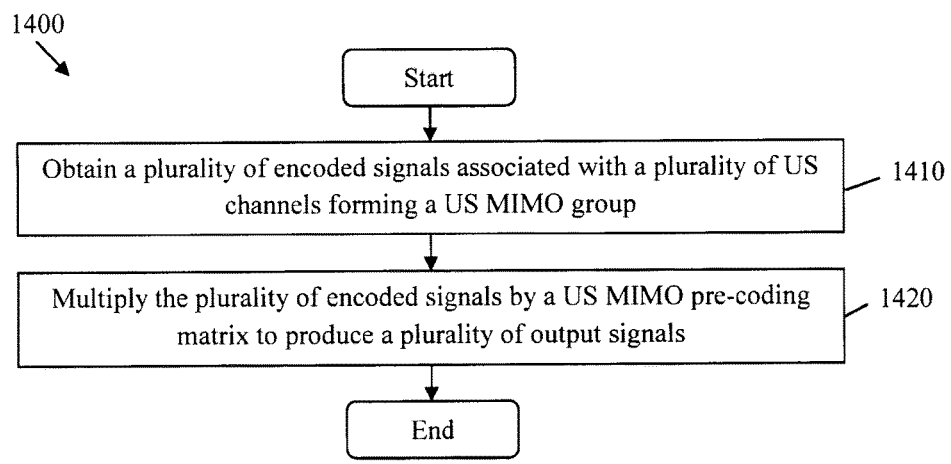
FIG. 14 is a flowchart of another embodiment of a method of performing US MU-MIMO DSL processing.

FIG. 14 is a flowchart of another embodiment of a method 1400 of performing US MU-MIMO DSL processing. The method 1400 is implemented by a DSL remote-side apparatus such as the xTU-Rs 321 and 421 collocated at a single residence such as the residences 320, 430, or 440 and the US receivers 710 when communicating with a DSL office-side equipment such as the collocated xTU-Os 311 and 411, the DPUs 310 and 410 in a system such as the systems 300 and 400. The method 1400 employs similar mechanisms as the US transmitters 730. The collocated xTU-Rs and corresponding collocated xTU-Os form a US MIMO group such as the MIMO groups 330, 450, 460, and 740. The method 1400 begins after obtaining a MIMO pre-coding matrix such as $V_{i,i}$ in equation (5), in equation (19), or $B_{i,i}$ in equation (20) for the US MIMO group. At step 1410, a plurality of encoded signals associated with a plurality of US channels forming the US MIMO group is obtained. At step 1420, the plurality of encoded signals is multiplied by US MIMO pre-coding matrices such as such as $V_{i,i}$ computed from equation (5), $T_{i,i}$ computed from equation (19), or $B_{i,i}$ computed from equation (20) to produce a plurality of output signals.

Figure 15:
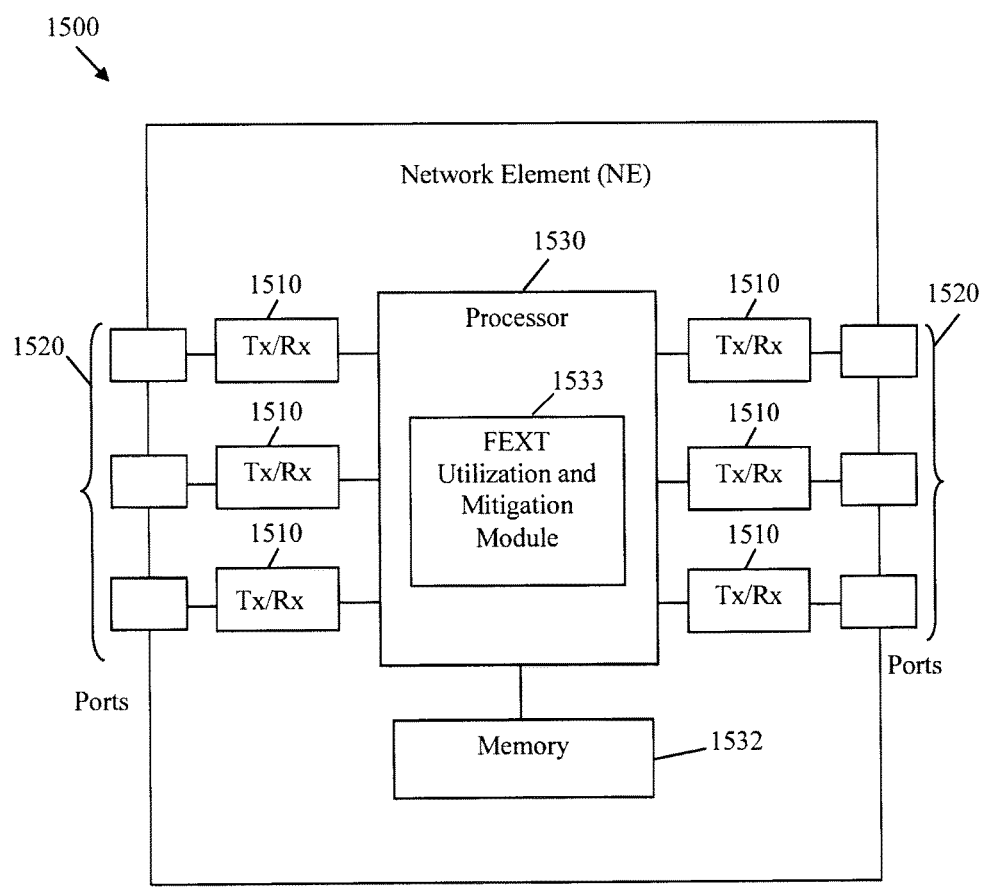
FIG. 15 is a schematic diagram of an embodiment of a NE.

FIG. 15 is a schematic diagram of an embodiment of a NE 1500. The NE 1500 may be a DPU such as the DPUs 110, 210, 310, 410, collocated xTU-Os such as the xTU-Os 111, 211, 311, 411, a DS transmitter such as the DS transmitter 610, and a US receiver such as the US receiver 710. The NE 1500 may also be DS receivers such as the DS receivers 630, and US transmitters such as the US transmitters 730 in a DSL system such as the DSL systems 300 and 400. NE 1500 may be configured to implement and/or support the FEXT utilization and mitigation mechanisms and schemes described herein. NE 1500 may be implemented in a single node or the functionality of NE 1500 may be implemented in a plurality of nodes. One skilled in the art will recognize that the term NE encompasses a broad range of devices of which NE 1500 is merely an example. NE 1500 is included for purposes of clarity of discussion, but is in no way meant to limit the application of the present disclosure to a particular NE embodiment or class of NE embodiments.

At least some of the features/methods described in the disclosure are implemented in a network apparatus or component, such as an NE 1500. For instance, the features/methods in the disclosure may be implemented using hardware, firmware, and/or software installed to run on hardware. The NE 1500 is any device that transports packets through a network, e.g., a DSL access module (DSLAM), a DSL router, bridge, server, a client, etc. As shown in FIG. 15, the NE 1500 comprises transceivers (Tx/Rx) 1510, which may be transmitters, receivers, or combinations thereof. The Tx/Rx 1510 is coupled to a plurality of ports 1520 for transmitting and/or receiving frames from other nodes. For example, the NE 1500 operates as a DSLAM at a DPU, communicates signal through a set of ports 1520 with remote DSL CPEs, and communicates signal through the other set of ports 1520 with a backbone network. In another example, the NE 1500 operates as a DSL CPE router, communicates signal through a set of ports 1520 with the DSLAM at DPU, and communicates through another set of ports with local devices inside a residence such as a laptop computer.

A processor 1530 is coupled to each Tx/Rx 1510 to process the frames and/or determine which nodes to send the frames to. The processor 1530 may comprise one or more multi-core processors and/or memory devices 1532, which may function as data stores, buffers, etc. The processor 1530 may be implemented as a general purpose processor or may be part of one or more application specific integrated circuits (ASICs) and/or digital signal processors (DSPs). The processor 1530 may comprise a FEXT utilization and mitigation module 1533.

The FEXT utilization and mitigation module 1533 implements MIMO pre-coding, MIMO post-coding, FEXT pre-coding, and FEXT cancellation depending on the embodiments as described in the methods 800, 900, 1000, and 1100, 1200, 1300, and 1400, and/or any other flowcharts, schemes, and methods discussed herein. As such, the inclusion of the FEXT utilization and mitigation 1533 and associated methods and systems provide improvements to the functionality of the NE 1500. Further, the FEXT utilization and mitigation 1533 effects a transformation of a particular article (e.g., the DSL system) to a different state. In an alternative embodiment, the FEXT utilization and mitigation 1533 may be implemented as instructions stored in the memory device 1532, which may be executed by the processor 1530.

The memory 1532 comprises one or more disks, tape drives, and solid-state drives and may be used as an overflow data storage device, to store programs when such programs are selected for execution, and to store instructions and data that are read during program execution. The memory 1532 may be volatile and non-volatile and may be read-only memory (ROM), random-access memory (RAM), ternary content-addressable memory (TCAM), and static random-access memory (SRAM).

Although the disclosed embodiments are described in the context of a DSL system where FEXT is the interference to be utilized within each MIMO group and cancelled across MIMO groups, the disclosed embodiments are suitable for use in any MU-MIMO communication system such as a wireless system and an IEEE 802.11 wireless local area network (WiFi) system. For example, a WiFi system employing MU-MIMO while communicating with multiple MIMO devices may benefit from the disclosed MU-MIMO processing mechanisms. In wireless systems, FEXT is referred to co-channel interference and is a signal received at a receiver from an un-intended transmitter antenna. In wireless systems, DS is referred to as downlink (DL) and US is referred to as uplink (UL).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In an embodiment, a NE includes means for obtaining a plurality of encoded signals associated with a plurality of DS channels in a network, wherein the plurality of DS channels form a plurality of DS MIMO groups, means for performing, via the processor, MIMO pre-coding on the plurality of encoded signals according to the plurality of DS MIMO groups, means for performing, via the processor, crosstalk pre-coding on the plurality of encoded signals jointly after performing the MIMO pre-coding to produce a plurality of output signals, and means for substantially synchronously transmitting, via transmitters of the NE, the plurality of output signals to a plurality of remote NEs via the plurality of DS channels.

In an embodiment, a communication system office-side apparatus includes means for obtaining a plurality of encoded signals associated with a plurality of DS channels in a network, wherein the plurality of DS channels form a plurality of DS MIMO groups, means for performing MIMO pre-coding on the plurality of encoded signals according to the plurality of DS MIMO groups, means for performing crosstalk pre-coding on the plurality of encoded signals jointly after performing the MIMO pre-coding to produce a plurality of output signals, and means for substantially synchronously transmitting the plurality of output signals to a plurality of remote NEs via the plurality of DS channels.

In an embodiment, a DSL remote-side apparatus includes means for receiving a plurality of downstream (DS) signals from a DSL office-side apparatus via a subset of a plurality of DS channels forming a DS multiple-input multiple-output (MIMO) group, wherein the plurality of DS signals are pre-coded according to a DS MIMO pre-coding matrix associated with the DS MIMO group at a first subcarrier and according to a DS far-end crosstalk (FEXT) pre-coding matrix associated with DS FEXT channels of the plurality of DS channels at the first subcarrier, and means for performing MIMO post-coding on the plurality of DS signals according to a DS MIMO post-coding matrix associated with the DS MIMO group.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in a wireless network element (NE), comprising:
- obtaining, via a processor of the wireless NE, a plurality of encoded signals associated with a plurality of downstream (DS) channels in a wireless communication network, wherein the plurality of DS channels form a plurality of DS multiple-input and multiple-output (MIMO) groups;
- performing, via the processor, MIMO pre-coding on the plurality of encoded signals according to the plurality of DS MIMO groups to produce MIMO pre-coder output signals of the plurality of DS MIMO groups;
- performing, via the processor, a crosstalk pre-coding across the MIMO groups using a crosstalk pre-coding matrix on the MIMO pre-coder output signals of the plurality of DS MIMO groups to produce a plurality of output signals, with the crosstalk pre-coding matrix computed according to a first DS channel matrix and a DS MIMO channel matrix;
- wherein the first DS channel matrix comprises first diagonal entries representing first direct channel estimates of the plurality of DS channels at a first subcarrier and first off-diagonal entries representing co-channel interference estimates of the plurality of DS channels at the first subcarrier, a first diagonal block of the first DS channel matrix representing MIMO channels in a first DS MIMO group of the plurality of DS MIMO groups; and
- wherein the DS MIMO channel matrix comprises a second diagonal block and off-diagonal blocks, the second diagonal block corresponding to the first diagonal block of the first DS channel matrix, and with the off-diagonal blocks comprising values of zeros; and
- synchronously transmitting, via one or more transmitters of the wireless NE, the plurality of output signals to a plurality of remote wireless NEs via the plurality of DS channels.

2. The method of claim 1, wherein a first subset of the plurality of DS channels forms a first DS MIMO group of the plurality of DS MIMO groups, wherein the method further comprises receiving, via receivers of the NE, a MIMO pre-coding matrix for the first DS MIMO group at a first subcarrier, wherein the MIMO pre-coding matrix is decomposed from a DS MIMO channel matrix comprising direct channel estimates of the first subset of the plurality of DS channels at the first subcarrier and crosstalk channel estimates of the first subset of the plurality of DS channels at the first subcarrier.

3. The method of claim 1, further comprising computing, via the processor, the crosstalk pre-coding matrix according to a product of an inverse of the first DS channel matrix and the DS MIMO channel matrix.

4. The method of claim 1, further comprising obtaining, via the processor, direct channel estimates of the plurality of DS channels at a first subcarrier, second crosstalk channel estimates within each of the plurality of DS MIMO groups at the first subcarrier, and third crosstalk channel estimates across the plurality of DS MIMO groups at the first subcarrier after performing the MIMO pre-coding and prior to performing the crosstalk pre-coding.

5. The method of claim 2, wherein performing the MIMO pre-coding comprises multiplying a subset of the plurality of encoded signals associated with the first DS MIMO group by the MIMO pre-coding matrix.

6. The method of claim 3, wherein the crosstalk pre-coding is performed across the MIMO groups by multiplying the plurality of encoded signals by the crosstalk pre-coding matrix.

7. The method of claim 4, wherein the direct channel estimates and the second crosstalk channel estimates are MIMO pre-coded and MIMO post-coded channel estimates.

8. A wireless network element (NE), comprising:
- a plurality of multiple-input and multiple-output (MIMO) pre-coders configured to perform MIMO pre-coding on a plurality of encoded signals associated with a plurality of downstream (DS) channels in a wireless communication network according to a plurality of DS MIMO groups to produce MIMO pre-coder output signals of the plurality of DS MIMO groups, wherein the plurality of DS channels form a plurality of DS multiple-input and multiple-output (MIMO) groups;
- a crosstalk pre-coder configured to perform a crosstalk pre-coding across the MIMO groups using a crosstalk pre-coding matrix on the MIMO pre-coder output signals of the plurality of DS MIMO groups to produce a plurality of output signals, with the crosstalk pre-coding matrix computed according to a first DS channel matrix and a DS MIMO channel matrix; and
- one or more transmitters configured to synchronously transmit the plurality of output signals to a plurality of remote wireless NEs via the plurality of DS channels;
- wherein the first DS channel matrix comprises first diagonal entries representing first direct channel estimates of the plurality of DS channels at a first subcarrier and first off-diagonal entries representing co-channel interference estimates of the plurality of DS channels at the first subcarrier, a first diagonal block of the first DS channel matrix representing MIMO channels in a first DS MIMO group of the plurality of DS MIMO groups; and
- wherein the DS MIMO channel matrix comprises a second diagonal block and off-diagonal blocks, the second diagonal block corresponding to the first diagonal block of the first DS channel matrix, and with the off-diagonal blocks comprising values of zeros.

9. The wireless NE of claim 8, wherein a first subset of the plurality of DS channels forms a first DS MIMO group of the plurality of DS MIMO groups, wherein the wireless NE further comprises a receiver configured to receive a MIMO pre-coding matrix for the first DS MIMO group at a first subcarrier, wherein the MIMO pre-coding matrix is decomposed from a DS MIMO channel matrix comprising direct channel estimates of the first subset of the plurality of DS channels at the first subcarrier and crosstalk channel estimates of the first subset of the plurality of DS channels at the first subcarrier.

10. The wireless NE of claim 8, wherein the crosstalk pre-coding matrix is computed according to a product of an inverse of the first DS channel matrix and the DS MIMO channel matrix.

11. The wireless NE of claim 8, further comprising a processor configured to obtain direct channel estimates of the plurality of DS channels at a first subcarrier, second crosstalk channel estimates within each of the plurality of DS MIMO groups at the first subcarrier, and third crosstalk channel estimates across the plurality of DS MIMO groups at the first subcarrier after performing the MIMO pre-coding and prior to performing the crosstalk pre-coding.

12. The wireless NE of claim 9, wherein the crosstalk pre-coder is further configured to multiply a subset of the plurality of encoded signals associated with the first DS MIMO group by the MIMO pre-coding matrix.

13. The wireless NE of claim 10, wherein the crosstalk pre-coding is performed across the MIMO groups by multiplying the plurality of encoded signals by the crosstalk pre-coding matrix.

14. The wireless NE of claim 11, wherein the direct channel estimates and the second crosstalk channel estimates are MIMO pre-coded and MIMO post-coded channel estimates.

15. A wireless network element (NE), comprising:
a processor configured to:
perform multiple-input and multiple-output (MIMO) pre-coding on a plurality of encoded signals associated with a plurality of downstream (DS) channels in a wireless communication network according to a plurality of DS MIMO groups to produce MIMO pre-coder output signals of the plurality of DS MIMO groups, wherein the plurality of DS channels form a plurality of DS multiple-input and multiple-output (MIMO) groups; and
crosstalk pre-coding across the DS MIMO groups using a crosstalk pre-coding matrix on the MIMO pre-coder output signals of the plurality of DS MIMO groups to produce a plurality of output signals, with the crosstalk pre-coding matrix computed according to a first DS channel matrix and a DS MIMO channel matrix; and
a transmitter coupled to the processor and configured to synchronously transmit the plurality of output signals to a plurality of remote wireless NEs via the plurality of DS channels,
wherein the first DS channel matrix comprises first diagonal entries representing first direct channel estimates of the plurality of DS channels at a first subcarrier and first off-diagonal entries representing co-channel interference estimates of the plurality of DS channels at the first subcarrier, a first diagonal block of the first DS channel matrix representing MIMO channels in a first DS MIMO group of the plurality of DS MIMO groups; and
wherein the DS MIMO channel matrix comprises a second diagonal block and off-diagonal blocks, the second diagonal block corresponding to the first diagonal block of the first DS channel matrix, and with the off-diagonal blocks comprising values of zeros.

16. The wireless NE of claim 15, wherein a first subset of the plurality of DS channels forms a first DS MIMO group of the plurality of DS MIMO groups, wherein the processor is further configured to receive a MIMO pre-coding matrix for the first DS MIMO group at a first subcarrier.

17. The wireless NE of claim 15, wherein the processor is further configured to compute the crosstalk pre-coding matrix according to a product of an inverse of the first DS channel matrix and the DS MIMO channel matrix.

18. The wireless NE of claim 15, wherein the crosstalk pre-coding is performed across the MIMO groups by multiplying the plurality of encoded signals by the crosstalk pre-coding matrix.

19. The wireless NE of claim 15, wherein the processor is further configured to obtain direct channel estimates of the plurality of DS channels at a first subcarrier, second crosstalk channel estimates within each of the plurality of DS MIMO groups at the first subcarrier, and third crosstalk channel estimates across the plurality of DS MIMO groups at the first subcarrier after performing the MIMO pre-coding and prior to performing the crosstalk pre-coding.

20. The wireless NE of claim 19, wherein the second direct channel estimates and the second crosstalk channel estimates are MIMO pre-coded and MIMO post-coded channel estimates.

* * * * *